(12) United States Patent
Kondo et al.

(10) Patent No.: US 8,238,205 B2
(45) Date of Patent: Aug. 7, 2012

(54) RECORDING MEDIUM HAVING A SUBSTRATE CONTAINING MICROSCOPIC PATTERN OF PARALLEL GROOVE AND LAND SECTIONS AND RECORDING/REPRODUCING EQUIPMENT THEREFOR

(75) Inventors: Tetsuya Kondo, Kanagawa-ken (JP); Kenji Oishi, Yokohama (JP)

(73) Assignee: JVC Kenwood Corporation, Kanagawa (JP)

( * ) Notice: Subject to any disclaimer, the term of this patent is extended or adjusted under 35 U.S.C. 154(b) by 0 days.

(21) Appl. No.: 13/017,859

(22) Filed: Jan. 31, 2011

(65) Prior Publication Data

US 2011/0122742 A1   May 26, 2011

Related U.S. Application Data

(63) Continuation of application No. 12/254,300, filed on Oct. 20, 2008, now Pat. No. 7,903,509, which is a continuation of application No. 11/424,340, filed on Jun. 15, 2006, now Pat. No. 7,457,207, which is a continuation of application No. 10/028,978, filed on Dec. 28, 2001, now Pat. No. 7,133,331.

(30) Foreign Application Priority Data

Dec. 28, 2000   (JP) ................. 2000-400667
Dec. 28, 2000   (JP) ................. 2000-400668
Sep. 25, 2001   (JP) ................. 2001-290997

(51) Int. Cl.
   *G11B 7/00*   (2006.01)
(52) U.S. Cl. ................. 369/44.13; 369/275.4; 369/275.3
(58) Field of Classification Search .................. None
   See application file for complete search history.

(56) References Cited

U.S. PATENT DOCUMENTS 4,651,172 A    3/1987    Watanabe et al.
(Continued)

FOREIGN PATENT DOCUMENTS

JP    04-117650/1992    4/1992
(Continued)

OTHER PUBLICATIONS

SPIE vol. 3864 "Technical Digest for ISOM/ODS'99", Publ. By SPIE—The International Society for Optical Engineering "Optical Disc System for Digital Video Recording", Tatsuya Nakahara et al., Jul. 1999 pp. 50-52.

(Continued)

*Primary Examiner* — Van Chow
(74) *Attorney, Agent, or Firm* — Connolly Bove Lodge & Hutz LLP

(57) ABSTRACT

An information recording medium 1 at least comprises a substrate 13 having a microscopic pattern 20, which is constituted by a shape of continuous substance of approximately parallel grooves formed with a groove section G and a land section L alternately, a recording layer 12 formed on the microscopic pattern 20 and a light transmission layer 11 formed on the recording layer. The microscopic pattern 20 is formed so as to satisfy a relation of $P<\lambda<NA$ and a thickness of the light transmission layer 11 is within a range of 0.07 to 0.12 mm, wherein P is a pitch of the groove section G or the land section L, $\lambda$ is a wavelength of reproducing light beam and NA is a numerical aperture of an objective lens. Further, there provided an information recording medium, which is improved in cross erase and recorded in high density, and a reproducing apparatus and a recording apparatus for the information recording medium.

1 Claim, 13 Drawing Sheets

U.S. PATENT DOCUMENTS

| | | | |
|---|---|---|---|
| 5,948,593 A | 9/1999 | Misawa et al. | |
| 5,974,025 A | 10/1999 | Yamada et al. | |
| 6,069,870 A | 5/2000 | Maeda et al. | |
| 6,192,022 B1 | 2/2001 | Hendriks et al. | |
| 6,240,056 B1 | 5/2001 | Tanase et al. | |
| 6,269,072 B1 | 7/2001 | Ohgo et al. | |
| 6,366,541 B1* | 4/2002 | Ohnuki et al. | 369/13.35 |
| 6,381,208 B1 | 4/2002 | Abe et al. | |
| 6,496,458 B2 | 12/2002 | Tsukihashi et al. | |
| 6,512,735 B1 | 1/2003 | Takeda et al. | |
| 6,590,857 B2 | 7/2003 | Ohkubo et al. | |
| 6,667,952 B2 | 12/2003 | Komaki et al. | |
| 6,721,259 B1 | 4/2004 | Yamamoto et al. | |
| 6,813,230 B1 | 11/2004 | Ko et al. | |
| 7,088,670 B2* | 8/2006 | Kondo | 369/275.4 |
| 7,133,311 B2 | 11/2006 | Liu | |
| 7,133,331 B2* | 11/2006 | Kondo et al. | 369/44.13 |
| 7,283,447 B2* | 10/2007 | Maruyama et al. | 369/111 |
| 7,411,873 B2* | 8/2008 | Kondo et al. | 369/44.13 |
| 7,457,207 B2* | 11/2008 | Kondo et al. | 369/44.13 |
| 7,729,210 B2* | 6/2010 | Kondo et al. | 369/44.13 |
| 7,729,211 B2* | 6/2010 | Kondo et al. | 369/44.13 |
| 7,903,509 B2* | 3/2011 | Kondo et al. | 369/44.35 |
| 7,907,483 B2* | 3/2011 | Kondo et al. | 369/44.35 |
| 7,961,564 B2* | 6/2011 | Kondo et al. | 369/44.13 |
| 2003/0008235 A1 | 1/2003 | Inoue et al. | 430/270.13 |
| 2003/0202436 A1 | 10/2003 | Tomita et al. | |
| 2006/0221805 A1* | 10/2006 | Kondo et al. | 369/275.3 |
| 2009/0022017 A1* | 1/2009 | Kondo et al. | 369/44.13 |
| 2009/0116370 A1* | 5/2009 | Kondo et al. | 369/275.4 |
| 2009/0116371 A1* | 5/2009 | Kondo et al. | 369/275.4 |
| 2010/0202279 A1* | 8/2010 | Kondo et al. | 369/275.3 |
| 2011/0122742 A1* | 5/2011 | Kondo et al. | 369/44.13 |
| 2011/0122743 A1* | 5/2011 | Kondo et al. | 369/44.13 |
| 2011/0134743 A1* | 6/2011 | Kondo et al. | 369/112.23 |

FOREIGN PATENT DOCUMENTS

| | | |
|---|---|---|
| JP | 4-246906 | 9/1992 |
| JP | 04-246906 | 9/1992 |
| JP | 04-318329 | 11/1992 |
| JP | 05-282705 | 10/1993 |
| JP | 06-333240 | 12/1994 |
| JP | 10-069646 | 3/1998 |
| JP | 2778405 | 5/1998 |
| JP | 10-261235/1998 | 9/1998 |
| JP | 11-066618 | 3/1999 |
| JP | 11-259985 | 9/1999 |
| JP | 11-346154 | 12/1999 |
| JP | 2000-011421 | 1/2000 |
| JP | 2000-187882 | 7/2000 |
| JP | 2000-187887 | 7/2000 |
| JP | 2000-286709 | 10/2000 |
| JP | 2001-110146 | 4/2001 |
| JP | 2001-155345 | 6/2001 |

OTHER PUBLICATIONS

Jpn. J. Appl. Phys. vol. 40(2001), Publ. by the Japan Society of Applies Physics "High-Density Rewritable Optical Disk Using Groove Recording", Kazumi Iwata et al., Mar. 2001, pp. 1637-1638.
International Standard ISO/IEC, 20563:2001, Information Technology—80mm and 120 mm DVD-Recordable Disk (DVD-R), p. 17, Publ. Jun. 1, 2001.
Michiharu Abe, "Organic Recording Materials for Optical Discs—Characteristics Required for Recording Film of Optical Disc," pp. 34 and 35, Published in 1989 by Bunshin Publishing Co., Ltd.

* cited by examiner

| Base-band before modulating | Base-band after modulated |
|---|---|
| 0 | 00, 11 |
| 1 | 01, 10 |

Fig. 13

| Base-band before modulating | 1 0 0 0 0 1 |
|---|---|
| Base-band after modulated | 01 00 11 00 11 01 |

Fig. 14

| | Film thickness of Reflective layer 121 (nm) | Film thickness of First protective layer 122 (nm) | Film thickness of Recording layer 123 (nm) | Film thickness of Second protective layer 124 (nm) | Reflectivity (%) | Modulated amplitude | Reproduction power at limit of deterioration (mW) | Judgement of deteriorated reproduction | Judgement of Reproduction error | Judgement of Address |
|---|---|---|---|---|---|---|---|---|---|---|
| Emb. 6 | 100 | 11.5 | 18 | 36 | 14.8 | 0.596 | 0.37 | ○ | ○ | ○ |
| Emb. 7 | 100 | 10.0 | 16 | 36 | 12.0 | 0.605 | 0.36 | ○ | ○ | ○ |
| Emb. 8 | 85 | 13.0 | 18 | 43 | 18.5 | 0.525 | 0.38 | ○ | ○ | ○ |
| Emb. 9 | 85 | 11.5 | 16 | 43 | 19.7 | 0.527 | 0.38 | ○ | ○ | ○ |
| Emb. 10 | 85 | 10.0 | 14 | 43 | 19.5 | 0.526 | 0.39 | ○ | ○ | ○ |
| Emb. 11 | 70 | 13.0 | 16 | 50 | 22.7 | 0.455 | 0.40 | ○ | ○ | ○ |
| Emb. 12 | 70 | 11.5 | 14 | 50 | 26.0 | 0.444 | 0.41 | ○ | ○ | ○ |
| Comp. 4 | 100 | 13.0 | 14 | 36 | 11.0 | 0.685 | 0.34 | × | ○ | ○ |
| Comp. 5 | 70 | 10.0 | 18 | 50 | 28.2 | 0.389 | 0.42 | ○ | × | ○ |

Note: "Emb." and "Comp." represent "Embodiment" and "Comparative example" respectively.

Fig. 18

RECORDING MEDIUM HAVING A SUBSTRATE CONTAINING MICROSCOPIC PATTERN OF PARALLEL GROOVE AND LAND SECTIONS AND RECORDING/REPRODUCING EQUIPMENT THEREFOR

CROSS REFERENCE TO RELATED APPLICATIONS

This application is a continuation of co-pending application Ser. No. 12/254,300 filed Oct. 20, 2008 (allowed), which is a continuation of application Ser. No. 11/424,340 filed Jun. 15, 2006, now U.S. Pat. No. 7,457,207, which is a continuation of application Ser. No. 10/028,978 filed on Dec. 28, 2001, now U.S. Pat. No. 7,133,331 and for which priority is claimed under 35 U.S.C. §120; and this application claims priority of Application No. 2000-400668 filed in Japan on Dec. 28, 2000; Application No. 2000-400667 filed in Japan on Dec. 28, 2000; and Application No. 2001-290997 filed in Japan on Sep. 25, 2001, under 35 U.S.C. §119; the entire contents of all are hereby incorporated by reference.

BACKGROUND OF THE INVENTION

1. Field of the Invention

The present invention relates to an information recording medium, a reproducing apparatus and a recording apparatus, which reads out information from the information recording medium which moves, and particularly relates to an information recording medium to be recorded and/or reproduced through an optical device, and a reproducing apparatus and a recording apparatus for such an information recording medium.

2. Description of the Related Art

Until now, there is existed a system for reading out information from an information recording medium, which moves. In such a system, reproduction is performed by using a device such as an optical device, a magnetic device and a capacitive device. A system, which records and/or reproduces by an optical device, is used extensively in daily living. With respect to a read only information recording medium to be reproduced by using a light beam having a wavelength $\lambda$ of 650 nm, for example, mediums such as a DVD (Digital Versatile Disc) Video prerecorded with video information, a DVD-ROM (Digital Versatile Disc-Read Only Memory) prerecorded with a program or like, and a DVD Audio disc and an SACD (Super Audio Compact Disc) prerecorded with musical information are well known.

Further, there is provided a DVD-R (Digital Versatile Disk-Recordable) as a recordable recording and reproducing type information recording medium, which uses dye. Furthermore, there is provided a DVD-RAM (Digital Versatile Disc-Random Access Memory), a DVD-RW (Digital Versatile Disk-ReWritable) and a DVD+RW (Digital Versatile Disk+ReWritable) as a recording and reproducing type information recording medium, which use phase change. Moreover, there is provided an ASMO (Advanced Storage Magneto-Optical) disc, an ID (intelligent image) disc and a GIGAMO (GIGAbyte Magneto-Optical) disc as a recording and reproducing type information recording medium using photo-magnetism.

On the other hand, in order to increase recording density of an information recording medium, a study for shortening a wavelength of laser beam has been continued for a long period of time. A second harmonic generating element invented recently and a semiconductor light emitting element composed of gallium nitride system compound (disclosed in the Japanese Patent No. 2778405, for example), emit light having a wavelength $\lambda$ of approximately 350 to 450 nm. Consequently, these elements can become an important light emitting element, which increases a recording density sharply.

In addition thereto, design for an objective lens coping with such a wavelength has been advanced, particularly, a lens having a numerical aperture (NA) of more than 0.7, which exceeds the NA 0.6 utilized for a DVD disc, is currently developed.

As mentioned above, a reproducing apparatus for an information recording medium having capability such that a wavelength $\lambda$ is shortened to 350 to 450 nm and an NA is more than 0.7 has been developing. It is expected that an optical disc system, which has a higher recording density extremely exceeding that of a current DVD disc, can be developed by using these techniques.

By using such a light beam having a shorter wavelength than one for a DVD disc and a lens having a higher NA, an information recording medium having an extremely higher recording density can be realized. However, coma aberration also increases extremely when an information recording medium is slanted. Consequently, an information recording medium of which thickness for light transmission is made extremely thinner than that of a DVD disc is required. Actually, a disc system called a "DVR land groove" has been proposed. In the disc system, by using a light emitting element having a wavelength of 405 nm and an objective lens having an NA of 0.85, a thickness of disc for light transmission is designed for 0.1 mm.

With referring to FIGS. 1 and 2, a conventional information recording medium is explained.

FIG. 1 is a cross sectional view of a conventional information recording medium according to the prior art.

FIG. 2 is a fragmentary plan view, partially enlarged, of the conventional information recording medium shown in FIG. 1.

As shown in FIG. 1, an information recording medium 100 is composed of a recording layer 120 and a light transmission layer 110, which are laminated on a substrate 130 in order. The substrate 130 is formed with a microscopic pattern 200. The recording layer 120 is formed on the microscopic pattern 200 directly. The microscopic pattern 200 has microscopic patterns composed of land sections L1 and L2 (hereinafter generically referred to as "land section L") and groove sections G1 through G3 (hereinafter generically referred to as "groove section G").

While recording, as shown in FIG. 2, a record mark M is formed on both the land section L and the groove section G (it is called a land-groove recording method.)

With paying attention to dimensions of the microscopic pattern 200, with defining that a minimum distance between the centers of adjacent groove sections G is a pitch P (a minimum distance between the centers of adjacent land sections L is also the pitch P), the land section L and the groove section G are formed so as to satisfy a relation P>S with respect to a reproduction spot diameter S of a light beam.

Further, the reproduction spot diameter S can be calculated by an equation $S=\lambda/NA$, where $\lambda$ is a wavelength of a laser beam for reproduction and NA is a numerical aperture of an objective lens. In other words, the pitch P is designed in order to satisfy a relation $P>\lambda/NA$.

In the information recording medium 100, an information recorded in the recording layer 120 is read out by irradiating a reproducing light beam incident on the light transmission layer 110. The information is taken out through the light transmission layer 110 after the reproducing light beam has been reflected by the surface of the recording layer 130 and reproduced.

The inventors of the present invention performed an experiment for recording and reproducing the information recording medium 100 actually manufactured by using a light emitting element radiating a light beam having a single wavelength within a range of 350 to 450 nm and an objective lens having a higher NA of 0.75 to 0.9, and then it is found that a cross erase phenomenon was remarkable.

The cross erase phenomenon is a phenomenon such that an information to be recorded in a land section L, for example, is recorded in a groove section G with overlapping a signal previously recorded in the groove section G when recording the information in the land section L. In other words, it is such a phenomenon that an information previously recorded in a groove section G is erased by recording another information in a land section L.

Further, this phenomenon can also be noticeable in a reverse case. That is, the cross erase phenomenon is also recognized if a previously recorded information in a land section L is observed when recording an information in a groove section G.

If the cross erase phenomenon occurs, as mentioned above, an information recorded in an adjacent track is damaged. In a case of an information system having larger capacity, an amount of lost information becomes excessively large. Consequently, affection to a user is enormous. Therefore, it is considered for such an information recording medium 100 that an information shall be recorded only in either land section L or groove section G. However, recording capacity of an information recording medium will decrease and a merit of the information recording medium having a potential of recording in higher density will decline.

SUMMARY OF THE INVENTION

Accordingly, in consideration of the above-mentioned problems of the prior art, an object of the present invention is to provide an information recording medium, which is improved in the cross erase phenomenon and recorded in a higher density, and a reproducing apparatus thereof and a recording medium thereof.

Particularly, an object of the present invention is to provide an information recording medium with assuming that it is recorded and reproduced by a light beam having a wavelength of 350 to 450 nm and a reproducing apparatus and a recording apparatus thereof.

In order to achieve the above object, the present invention provides, according to an aspect thereof, an information recording medium, which at least comprising: a substrate having a microscopic pattern, which is constituted by a shape of continuous substance of approximately parallel grooves formed with a groove section and a land section alternately; a recording layer formed on the microscopic pattern; and a light transmission layer formed on the recording layer, the information recording layer is characterized in that the microscopic pattern is formed so as to satisfy a relation of $P<\lambda/NA$ and a thickness of the light transmission layer is within a range of 0.07 to 0.12 mm, wherein P is a pitch of the groove section or the land section, $\lambda$ is a wavelength of reproducing light beam and NA is a numerical aperture of objective lens.

According to another aspect of the present invention, there provided a reproducing apparatus, which reproduces an information recording medium at least comprising: a substrate having a microscopic pattern, which is constituted by a shape of continuous substance of approximately parallel grooves formed with a groove section and a land section alternately; a recording layer formed on the microscopic pattern; and a light transmission layer formed on the recording layer, wherein the information recording layer is characterized in that the microscopic pattern is formed so as to satisfy a relation of $P<\lambda/NA$ and a thickness of the light transmission layer is within a range of 0.07 to 0.12 mm, and wherein P is a pitch of the groove section or the land section, $\lambda$ is a wavelength of reproducing light beam and NA is a numerical aperture of objective lens, the reproducing apparatus comprising:

a pickup composed of a light emitting element having a wavelength of $\lambda$ within a range of 350 to 450 nm and an objective lens having a numerical aperture of NA within a range of 0.75 to 0.9 for reading out reflected light from the information recording medium; a motor for rotating the information recording medium; a servo device for controlling to drive the pickup and the motor; a turntable for supporting the information recording medium while rotating; a demodulator for demodulating an information signal read out by the pickup; an interface (I/F) for transmitting a signal demodulated by the demodulator externally; and a controller for controlling the reproducing apparatus totally.

According to further aspect of the present invention, there provided a recording apparatus for recording an original information signal on an information recording medium at least comprising: a substrate having a microscopic pattern, which is constituted by a shape of continuous substance of approximately parallel grooves formed with a groove section and a land section alternately; a recording layer formed on the microscopic pattern; and a light transmission layer formed on the recording layer, wherein the information recording layer is characterized in that the microscopic pattern is formed so as to satisfy a relation of $P<\lambda/NA$ and a thickness of the light transmission layer is within a range of 0.07 to 0.12 mm, and wherein P is a pitch of the groove section or the land section, $\lambda$ is a wavelength of reproducing light beam and NA is a numerical aperture of objective lens, the recording apparatus comprising: a pickup composed of a light emitting element having a wavelength of $\lambda$ within a range of 350 to 450 nm and an objective lens having a numerical aperture of NA within a range of 0.75 to 0.9 for reading out reflected light from and recording on the information recording medium; a motor for rotating the information recording medium; a servo device for controlling to drive the pickup and the motor; a turntable for supporting the information recording medium while rotating; an interface (I/F) for receiving the original information signal to be recorded; a modulator for modulating the original information signal; a waveform converter for converting the original information signal into a format suitable for a recording characteristic of the recording layer of the information recording medium; an auxiliary information demodulator for demodulating a differential signal outputted from the pickup; and a controller for controlling the recording apparatus totally.

Other object and further features of the present invention will be apparent from the following detailed description when read in conjunction with the accompanying drawings.

BRIEF DESCRIPTION OF DRAWINGS

FIG. 13 is a table exhibiting a change of fundamental data of before and after a base-band modulation.

FIG. 14 is a table of definite example exhibiting a change of data array of before and after a base-band modulation.

FIG. 18 is a table showing reflectivity and reproduction characteristics of embodiments 6 through 12 and comparative examples 4 and 5.

DETAILED DESCRIPTION OF THE PREFERRED EMBODIMENTS

[First Embodiment]

With referring to FIGS. 3 and 4, an information recording medium according to a first embodiment of the present invention will be explained.

Figure 1:
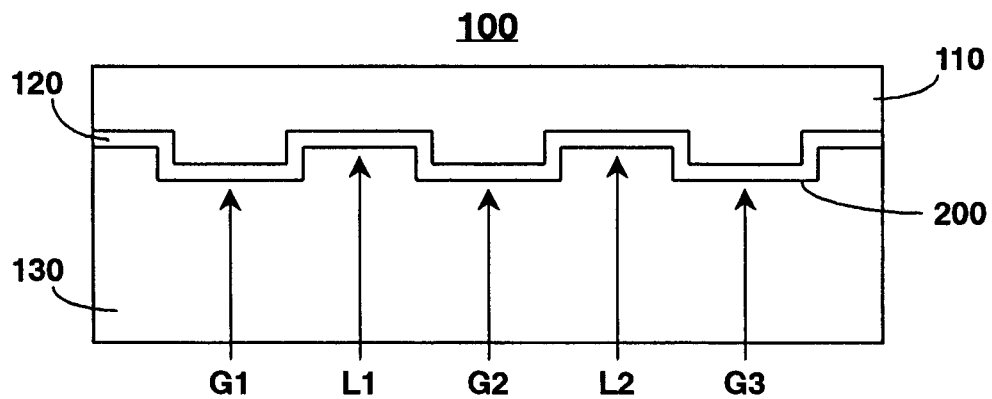
FIG. 1 is a cross sectional view of a conventional information recording medium according to the prior art.
Figure 2:
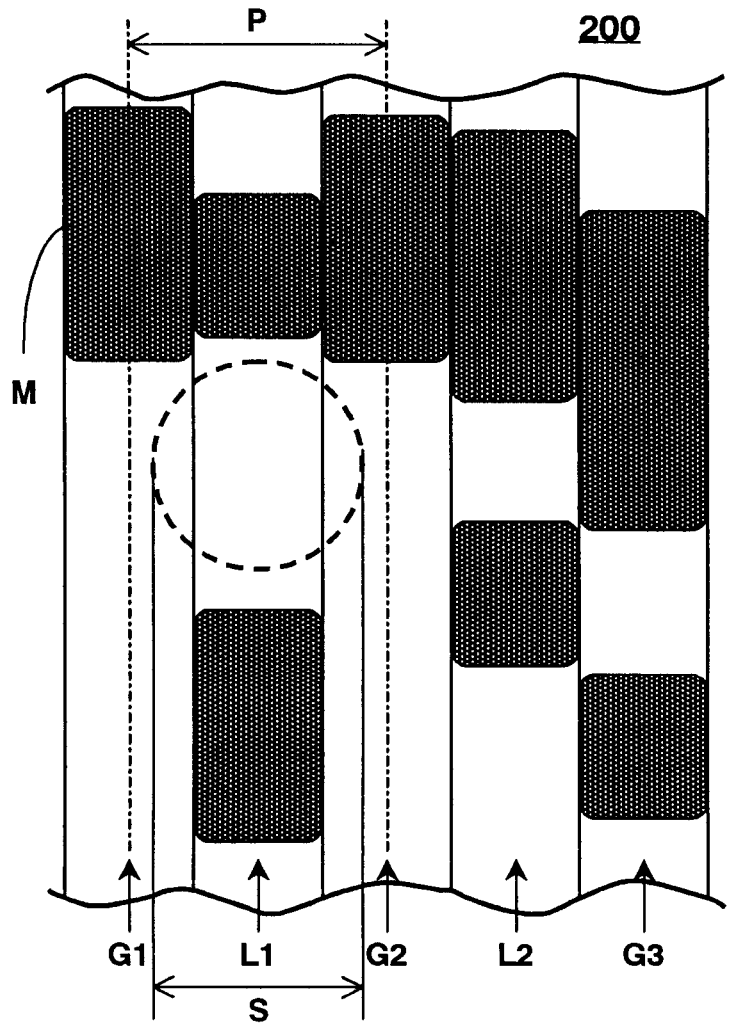
FIG. 2 is a fragmentary plan view, partially enlarged, of the conventional information recording medium shown in FIG. 1.
Figure 3:
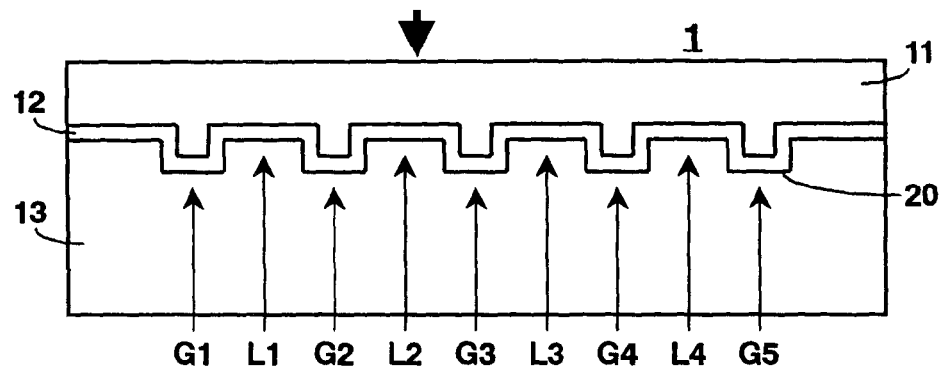
FIG. 3 is a cross sectional view of an information recording medium according to a first embodiment of the present invention.

FIG. 3 is a cross sectional view of an information recording medium according to a first embodiment of the present invention.

Figure 4:
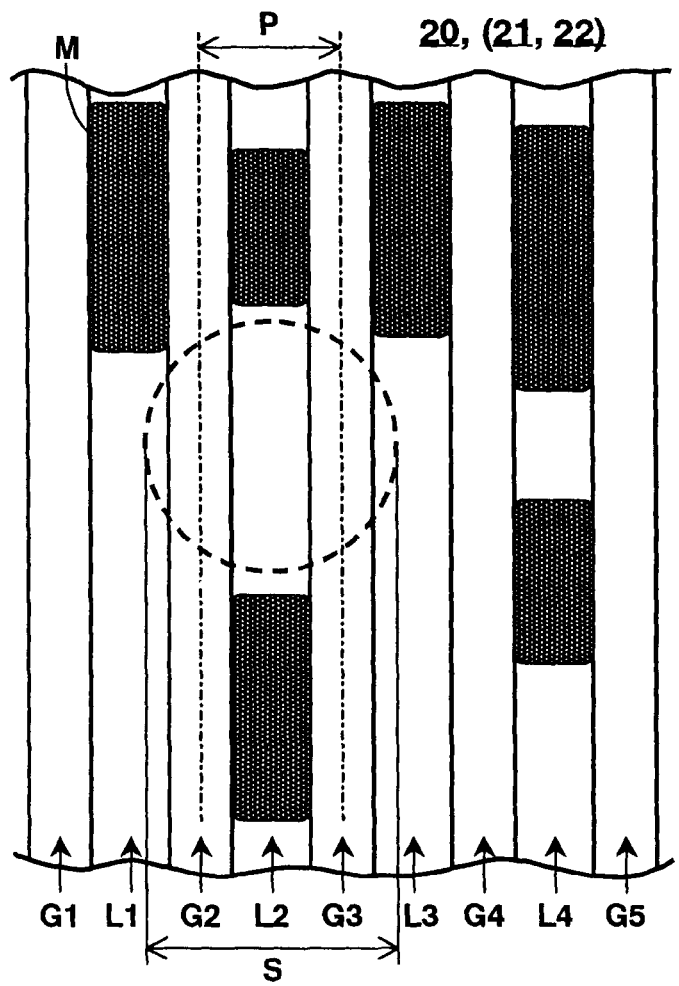
FIG. 4 is a fragmentary plan view, partially enlarged, of the information recording medium shown in FIG. 3.

FIG. 4 is a fragmentary plan view, partially enlarged, of the information recording medium shown in FIG. 3.

In FIG. 3, an information recording medium 1 is at least composed of a recording layer 12 and a light transmission layer 11, which are formed and laminated on a substrate 13 formed with a rugged microscopic pattern 20 in order. Ruggedness of the microscopic pattern 20 is almost in a shape of continuous substance of parallel grooves G1 through G5 (hereinafter generically referred to as groove section G), wherein a plurality of land L1 through L4 (hereinafter generically referred to as land section L) is provided between the groove sections G.

The information recording medium 1 is a read only type medium, which can be reproduced by using an apparatus composed of a light emitting element radiating a light beam having a single wavelength within a range of 350 to 450 nm and an objective lens having an NA of 0.75 to 0.9. Further, a shape of the information recording medium 1 can be applicable to any shape such as a disc, a card and a strip or tape. Furthermore, it is also applicable to a circular, square or oval shape. Moreover, a hole can be provided thereon.

In FIG. 4, "M" is a record mark formed on each of the land sections L1 through L4 (hereinafter referred to as land section L generically) while recording. "P" is a pitch distance between the centers of groove sections G2 and G3 (hereinafter referred to as groove section G generically). "S" is a spot diameter of reproducing light beam (reproduction spot diameter).

In the following paragraphs, the substrate 13, the recording layer 12 and the light transmission layer 11 will be detailed.

The substrate 13 is a base having a function of mechanically holding the recording layer 12 and the light transmission layer 11 formed thereon. With respect to a material of the substrate 13, any one of synthetic resin, ceramic and metal can be used.

Typical examples of the synthetic resin are as follows: polycarbonate, polymethyle methacrylate, polystyrene, copolymer of polycarbonate and polystyrene, polyvinyl chloride, alicyclic polyolefin, various thermoplastic and thermosetting resins such as polymethyle pentene and various energy ray curable resins (including examples of ultraviolet (UV) ray curable resins, visible light curable resins and electron beam curable resins). They can be used suitably. Further, these materials can be applicable to be combined with metal powder or ceramic powder.

Further, typical examples of ceramics are as follows: soda lime glass, soda aluminosilicate glass, borosilicate glass and silica glass. Furthermore, a metal plate such as aluminum having no ability for light transmission can be used as a typical example of metal.

In order to support other layers mechanically, thickness of the substrate 13 is 0.3 to 3 mm, preferably 0.5 to 2 mm. In a case that the information recording medium 1 is shaped in disc, it is most desirable to be designed such that a total thickness including the substrate 13, the recording layer 12 and the light transmission layer 11 becomes 1.2 mm so as to be interchangeable with conventional optical discs.

The recording layer 12 is a thin film layer having a function of reading out information, recording information or rewriting information. In the recording layer 12, information is recorded in either one section of the land section L and the groove section G. A material, which generates a change of reflectivity, a change of refractive index or both of them, is utilized for the recording layer 12. With respect to a material for the recording layer 12, there is provided a phase change material, which generates a change of reflectivity or change of refractive index or both changes between amorphous and crystal by thermal recording, or a dye material.

There is provided phase change materials such as Ge—Sb—Te system, Ag—In—Sb—Te system, Cu—Al—Sb—Te system and Ag—Al—Sb—Te system. These recording materials can contain one or more elements as an additive element within a range of more than 0.01 atomic % and less than 10 atomic % in total. Such an additive element is selected out of Cu, Ba, Co, Cr, Ni, Pt, Si, Sr, Au, Cd, Li, Mo, Mn, Zn, Fe, Pb, Na, Cs, Ga, Pd, Bi, Sn, Ti, V, Ge, Se, S, As, Tl and In.

With respect to compositions of each element, for example, there is existed $Ge_2Sb_2Te_5$, $Ge_1Sb_2Te_4$, $Ge_8Sb_{69}Te_{23}$, $Ge_8Sb_{74}Te_{18}$, $Ge_5Sb_{71}Te_{24}$, $Ge_5Sb_{76}Te_{19}$, $Ge_{10}Sb_{68}Te_{22}$ and $Ge_{10}Sb_{72}Te_{18}$ and a system adding a metal such as Sn and In to the Ge—Sb—Te system as for the Ge—Sb—Te system. Further, as for the Ag—In—Sb—Te system, there is existed $Ag_4In_4Sb_{66}Te_{26}$, $Ag_4In_4Sb_{64}Te_{28}$, $Ag_2In_6Sb_{64}Te_{28}$, $Ag_3In_5Sb_{64}Te_{28}$, $Ag_2In_6Sb_{66}Te_{26}$, and a system adding a metal or semiconductor such as Cu, Fe and Ge to the Ag—In—Sb—Te system.

With respect to a dye material, porphyrin dye, cyamine dye, phthalocyamine pigment, naphthalocyamine pigment, azo dye, naphthoquinone dye, fulgide dye, polymethine dye and acridine dye can be used.

Furthermore, with respect to a material for the recording layer 12, a magneto-optical material, which is reproduced by a change of Kerr rotation angle, can also be used. More accurately, alloys composed of an element such as terbium, cobalt, iron, gadolinium, chromium, neodymium, dysprosium, bismuth, palladium, samarium, holmium, praseodymium, manganese, titanium, erbium, ytterbium, lutetium and tin are used, (wherein an alloy includes a compound such as oxide, nitride, carbide, sulfide and fluoride). Particularly, constituting an alloy of a transition metal, which is represented by TbFeCo, GdFeCo and DyFeCo, with rare earth element is preferable. Moreover, the recording layer 12 can be constituted by using an alternate lamination layer of cobalt and platinum.

With respect to a forming method of these phase change material, dye material and magneto-optical material, such methods as vacuum deposition of resister heating type or electron beam type, direct current sputtering, high frequency sputtering, reactive sputtering, ion beam sputtering, ion plating and chemical vapor deposition (CVD) can be used. Further, with respect to a material out of dye materials, particularly, a material solvable by solvent, a liquid phase film forming method such as dip coating, spin coating, bar coating, knife coating and roll coating can be used.

The light transmission layer 11 has a function of transmitting a converged reproducing light to the recording layer 12 in a condition of less optical distortion (the reproducing light is shown by an arrow in FIG. 3). For example, by using a reproducing light having a wavelength $\lambda$, a material having a light transmittance of more than 70% with respect to the reproducing light having the wavelength $\lambda$, preferably more than 80% can be utilized suitably. It is necessary for the light transmission layer 11 to be less optical anisotropy. With considering to control reduction of reproducing light, actually, a material having a birefringence of less than ±100 nm, preferably ±50 nm, more preferably ±30 nm by 90-degree (vertical) incident double paths is used.

Materials having such a characteristic such as polycarbonate, polymethyle methacrylate, cellulose triacetate, polystyrene, copolymer of polycarbonate and polystyrene, polyvinyl chloride, alicyclic polyolefin and polymethyle pentene an be used the light transmission layer 11.

Further, it can be applicable to the light transmission layer 11 that the light transmission layer 11 has a function of protecting the recording layer 12 mechanically and chemically. With respect to materials having such a function, a material having higher stiffness such as, for example, transparent ceramics (such as soda lime glass, soda aluminosilicate glass, borosilicate glass and silica glass), thermosetting plastics and energy ray curable resins (such as UV ray curable resins, visible light curable resins and electron beam curable resins) can be suitably used.

Furthermore, a thickness of the light transmission layer 11 is desired to be less than 0.120 mm from a point of view that coma aberration can be suppressed when the information recording medium 1 is slanted with respect to a reproducing light beam or recording light beam. More, from another point of view of preventing the recording layer 12 from a scratch, it is desired to be more than 0.07 mm. In other words, the thickness is desired to be within a range of 0.070 to 0.120 mm. If a material of the light transmission layer 11 is one of the materials mentioned above, an index "z" of refraction is 1.45 to 1.7. Therefore, in a case of considering optical factors, a range of ideal thickness of the light transmission layer 11 is 0.093 to 0.107 mm.

Moreover, scattering of thickness in one plane shall be ±0.003 mm at the maximum, desirably less than ±0.002 mm. More desirably, it must be less than ±0.001 mm.

With referring to FIG. 4, the microscopic pattern 20, which is one of the features of the present invention, is explained next.

As mentioned above, microscopically, the microscopic pattern 20 is composed of a continuous substance of almost parallel grooves. On the other hand, macroscopically, it can be formed in any shape such as line, coaxial and spiral.

As shown in FIG. 4, in the microscopic pattern 20, a raised portion is the land section L and a sunken portion is the groove section G, wherein they are arranged alternately in parallel with each other.

The groove section G follows the definition of the Table 4.4-1 listed in the text "Understanding Optical Disc by this" (edited by the Japan Patent Office, published in 2000 by Japan Institute of Invention and Innovation). That is to say, in a disc, the groove section G is "a sunken groove, which is previously provided spirally or coaxially in order to form a recording track on a surface of substrate". Further, the land section L also follows the definition in the same text. That is, in a disc, the land section L is "a raised portion, which is previously provided spirally or coaxially in order to form a recording track on a surface of substrate", wherein the substrate is equivalent to the substrate 13 of the present invention.

If it is defined that a minimum distance between the centers of adjacent groove sections G is the pitch P (a minimum distance between the centers of adjacent land sections L is also the pitch P), the land section L and the groove section G are formed so as to satisfy a relation P<S with respect to the reproduction spot diameter S of a light beam, wherein the reproduction spot diameter S is calculated by a equation S=$\lambda$/NA, where $\lambda$ is a wavelength of a laser beam for reproduction and NA is a numerical aperture of an objective lens. In other words, the pitch P satisfies a relation P<$\lambda$/NA. For example, the pitch P is set to be within a range of 250 to 600 nm. If it is considered that a HDTV (High Definition Television) picture is recorded for a period of two hours approximately, the pitch P is desirable to be within a range of 250 to 450 nm.

An appropriate depth of the groove G is within a range of 10 to 300 nm, particularly, with considering a wavelength $\lambda$ of a reproduction optical system, the depth is suitable within a range of $\lambda/(8z)$ to $\lambda/(18z)$, wherein "z" is an index of refraction of the light transmission layer 11 at the wavelength $\lambda$. In a case of considering that $\lambda$=405 nm and z=1.6 (polycarbonate), for example, a most suitable range of the depth is within a range of 14 to 32 nm.

Microscopically, one groove section G and the other groove section G, one land section L and the other land section G, and the groove section G and the land section L are in parallel to each other respectively. However, in order to embed an analog or digital auxiliary information such as clock and address, these sections can be wobbled very little.

For example, it is acceptable that these grooves are recorded with a single frequency so as to embed clock, and consequently wobbled sinusoidally on the surface of the substrate 13. In order to embed an auxiliary information (sub information) such as address, these grooves can be modulated in amplitude modulation (AM), frequency modulation (FM) or phase modulation (PM) and wobbled in various patterns.

In other words, at least either one of an area recorded with a single frequency for clock and a modulation recording area for embedding address can be formed in either the groove section G or the land section L. A modulation method for embedding the auxiliary information (sub information) such as address will be detailed.

In a case that the information recording medium 1 is shaped in disc, the wobbling mentioned above can be recorded by the CAV (Constant Angular Velocity) method or the CLV (Constant Linear Velocity) method. Further, with forming zones varying by radius, the ZCAV (Zone Constant Angular Velocity) method or the ZCLV (Zone Constant Linear Velocity) method of which controlling varies by each zone can also be adopted.

Furthermore, although it is not shown, the groove section G or the land section L is cut in pieces over a certain area in order to embed an auxiliary information such as address, an inherent pit can be formed. More, by allocating an inherent pit in the groove section G adjacent to the land section L, or by allocating the inherent pit in the land section L in adjacent to the groove section G, an auxiliary information such as address can be embedded. Moreover, a hologram or a visible microscopic pattern for identifying the information recording medium 1 can be formed in an area other than a recording area.

In the information recording medium 1, an information recorded in the recording layer 12 is read out by irradiating a reproducing light beam incident on the light transmission layer 11. The information is taken out through the light transmission layer 11 after the reproducing light beam has been reflected by the surface of the recording layer 13 and reproduced.

The surface itself of the recording layer 12 of the information recording medium 1 has a certain degree of reflectivity, so that a reproduction can be functioned by the recording layer 12 as it is. However, in order to improve a reflectivity of a reproducing light beam and to add other functions such as increasing a number of rewritings and improving weather resistance, a reflective layer or a protective layer can be provided in adjacent to the recording layer 12. In addition thereto, materials for the reflective layer and the protective layer will be detailed.

Cross erase of the information recording medium 1 of the present invention is evaluated in comparison with that of the conventional information recording medium 100.

The configuration of the information recording mediums 1 and 100 are such that the substrates 13 and 130 are polycarbonate resin, the recording layers 12 and 120 are AgInSbTe one of phase change materials and the light transmission layers 11 and 110 are polycarbonate resin.

Evaluation is performed as follows: recording a second track and reproducing, recording first and third tracks with a frequency other than that of recorded in the second track 10 times, and then measuring an output of the second track once again.

As a result of the evaluation, by the conventional information recording medium 100, cross ease of −5 dB in maximum is observed. However, by the information recording medium 1 of the present invention, cross ease of −2 dB in maximum is observed. That is to say, in the conventional information recording medium 100, an output reduces by 5 dB in comparison with an output of the second track if the first and third tracks are not recorded. On the contrary, an output of the information recording medium 1 of the present invention reduces by only 2 dB.

In other words, by using the information recording medium 1 according to the present invention, cross erase is improved by 3 dB in comparison with the conventional information recording medium 100.

According to an aspect of the first embodiment of the present invention, as mentioned above, with defining that a pitch between two adjacent groove sections G or land sections L is "P", a wavelength of laser beam is "$\lambda$" and a numerical aperture of objective lens is "NA", an information recording medium is constituted such that a microscopic pattern 20 having a relation of "P<$\lambda$/NA" is formed and either the land section L or groove section G is recorded. Accordingly, an information recording medium, which is recorded in high density in conjunction with enabling to reduce cross erase, can be obtained.

[Second Embodiment]

Figure 5:
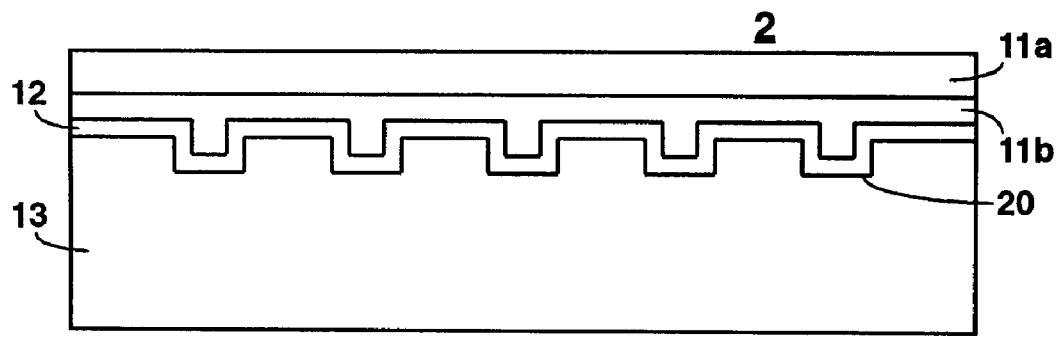
FIG. 5 is a cross sectional view of an information recording medium according to a second embodiment of the present invention.

With referring to FIG. 5, an information recording medium according to a second embodiment of the present invention is explained.

FIG. 5 is a cross sectional view of an information recording medium according to a second embodiment of the present invention.

In FIG. 5, same compositions as those of the first embodiment shown in FIG. 3 are indicated by the same sign as that of the first embodiment respectively and their explanations are omitted.

As shown in FIG. 5, an information recording medium 2 is the same configuration as that of the first embodiment except for the light transmission layer 11. A light transmission layer of the second embodiment is composed of a light transmission layer 11a and an adhesive light transmission layer 11b.

The light transmission layer 11a is identical to the light transmission layer 11 of the first embodiment. On the contrary, the adhesive light transmission layer 11b is a layer for adhering the light transmission layer 11a to the recording layer 12 firmly and an adhesive resin having a light transmittance of more than 70%, desirably more than 80% for a light beam having a wavelength $\lambda$. Such an adhesive resin is as follows: thermosetting resin, various energy ray curable resin (such as UV ray curable resin, visible light curable resin and electron beam curable resin), moisture curable resin, plural liquid mixture curable resin and thermoplastic resin containing solvent.

A thickness of the adhesive light transmission layer 11b is desirable to be more than 0.001 mm as a minimum thickness for exhibiting adhesion and less than 0.04 mm in consideration of preventing an adhesive material from stress crack, more desirable to be within a range of more than 0.001 mm and less than 0.03 mm. The most desirable thickness is within a range of more than 0.001 mm and less than 0.02 mm. However, in consideration of warp of the total information recording medium 2, the thickness is most desirable to be within a range of more than 0.001 mm and less than 0.01 mm.

With respect to a coating method of the light transmission layer 11a, such a method as spin coat, splay, dip, blade coat, roll coat, knife coating, screen printing and offset printing can be used.

The information recording medium 2 of the second embodiment is evaluated for cross erase by the same manner as that of the first embodiment and an identical result with the first embodiment is obtained.

Consequently, an identical effect with the information recording medium 1 according to the first embodiment can be obtained by the information recording medium 2 according to the second embodiment of the present invention.

[Third Embodiment]

Figure 6:
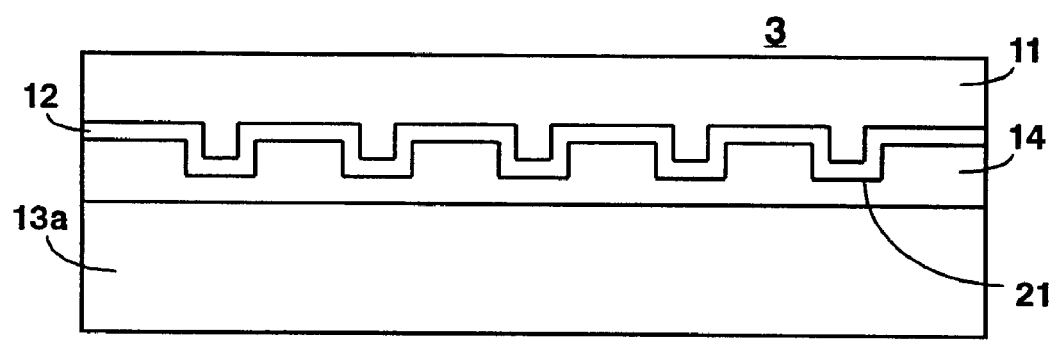
FIG. 6 is a cross sectional view of an information recording medium according to a third embodiment of the present invention.

With referring to FIG. 6, an information recording medium according to a third embodiment of the present invention is explained.

FIG. 6 is a cross sectional view of an information recording medium according to a third embodiment of the present invention.

In FIG. 6, same compositions as those of the first embodiment shown in FIG. 3 are indicated by the same sign as that of the first embodiment respectively and their explanations are omitted.

As shown in FIG. 6, an information recording medium 3 is the same configuration as that of the first embodiment except for a resin layer 14 formed with a microscopic pattern 21. The information recording medium 3 is composed of the resin layer 14 formed with the microscopic pattern 21, a recording layer 12 and a light transmission layer 11, which are laminated on a substrate 13a in order.

In the information recording medium 3 according to the third embodiment of the present invention, forming the microscopic pattern 21 on the resin layer 14 is different from the first embodiment of which the microscopic pattern 20 is formed on the surface of the substrate 13.

A material for the resin layer 14 is as follows: thermosetting resin, various energy ray curable resin (such as UV ray curable resin, visible light curable resin and electron beam curable resin), moisture curable resin, plural liquid mixture curable resin and thermoplastic resin containing solvent. A light beam for reproducing or recording does not reach as far as the resin layer 14, so that there is no restriction for a transmittance of material of the resin layer 14. With respect to a thickness of the resin layer 14, it is desirable to be less than 0.02 mm in consideration of warp of the information recording medium 3 in total.

The information recording medium 3 of the third embodiment is evaluated for cross erase by the same manner as that of the first embodiment and an identical result with the first embodiment is obtained.

Consequently, an identical effect with the information recording medium 1 according to the first embodiment can be obtained by the information recording medium 3 according to the third embodiment of the present invention.

[Fourth Embodiment]

Figure 7:
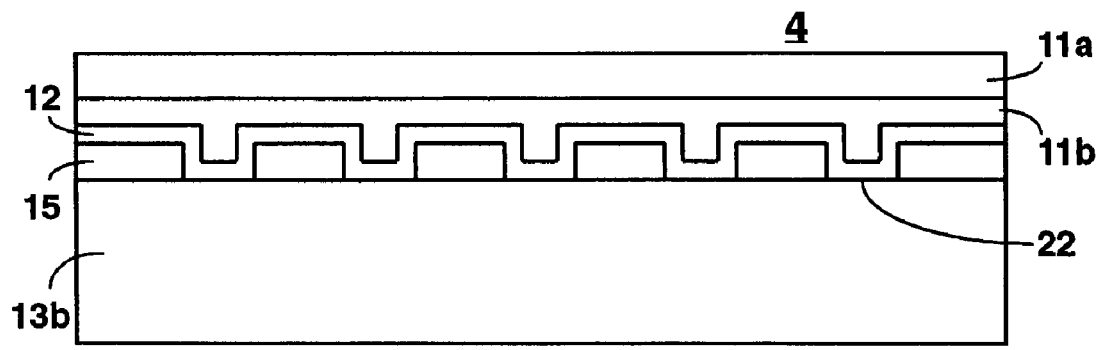
FIG. 7 is a cross sectional view of an information recording medium according to a fourth embodiment of the present invention.

With referring to FIG. 7, an information recording medium according to a fourth embodiment of the present invention is explained.

FIG. 7 is a cross sectional view of an information recording medium according to a fourth embodiment of the present invention.

In FIG. 7, a same composition as that of the first embodiment shown in FIG. 3 is indicated by a same sign as that of the first embodiment and its explanation is omitted.

As shown in FIG. 7, an information recording medium 4 is composed of a pattern transferring layer 15 having a microscopic pattern 22, a recording layer 12, an adhesive light transmission layer 11a and a light transmission layer 11b, which are laminated on a substrate 13b in order.

Further, in the information recording medium 4 according to the fourth embodiment of the present invention, it is different from the second embodiment that the top surface of the substrate 13b being in contact with the pattern transferring layer 15 is flat, and that the microscopic pattern 22 is formed on the pattern transferring layer 15 adjoining to the substrate 13b.

The pattern transferring layer 15 is an extremely thin film so as to have the microscopic pattern 22. With respect to a material for the pattern transferring layer 15, it is selected out of a metal, its alloy (including composition such as oxide, nitride, carbide, sulfide and fluoride), and resin. Further, thickness of the material is chosen from a range of 5 nm to 0.020 mm approximately. A typical example of resin is such as novolac photosensitive resin and polyhydroxy styrene photosensitive resin, which can be developed by alkali.

The information recording medium 4 of the fourth embodiment is evaluated for cross erase by the same manner as that of the first embodiment and an identical result with the first embodiment is obtained.

Consequently, an identical effect with the information recording medium 1 according to the first embodiment can be obtained by the information recording medium 4 according to the fourth embodiment of the present invention.

It is apparent that each component of the information recording mediums 1 through 4 shown in FIGS. 3 through 7 respectively can be replaced with each other or combined as far as a reproduction characteristic is not deteriorated. For example, by preparing two mediums out of the information recording mediums 1 through 4, they can be adhered together with facing each substrate 13, 13a or 13b (hereinafter generically referred to as "substrate 13") towards each other. Further, another set of the recording layer 12 and the light transmission layer 11 or 11a (hereinafter generically referred to as "light transmission layer 11") can be laminated on the light transmission layer 11 of the information recording mediums 1 through 4. By constituting as mentioned above, a recording capacity of the information recording medium 1 through 4 can be increased approximately twice.

Furthermore, although not shown in any drawings, an antistatic layer commonly known can be formed on the surface of light transmission layer 11 opposite to the recording layer 12 in order to decrease dust adhering to the surface of the light transmission layer 11.

Figure 15:
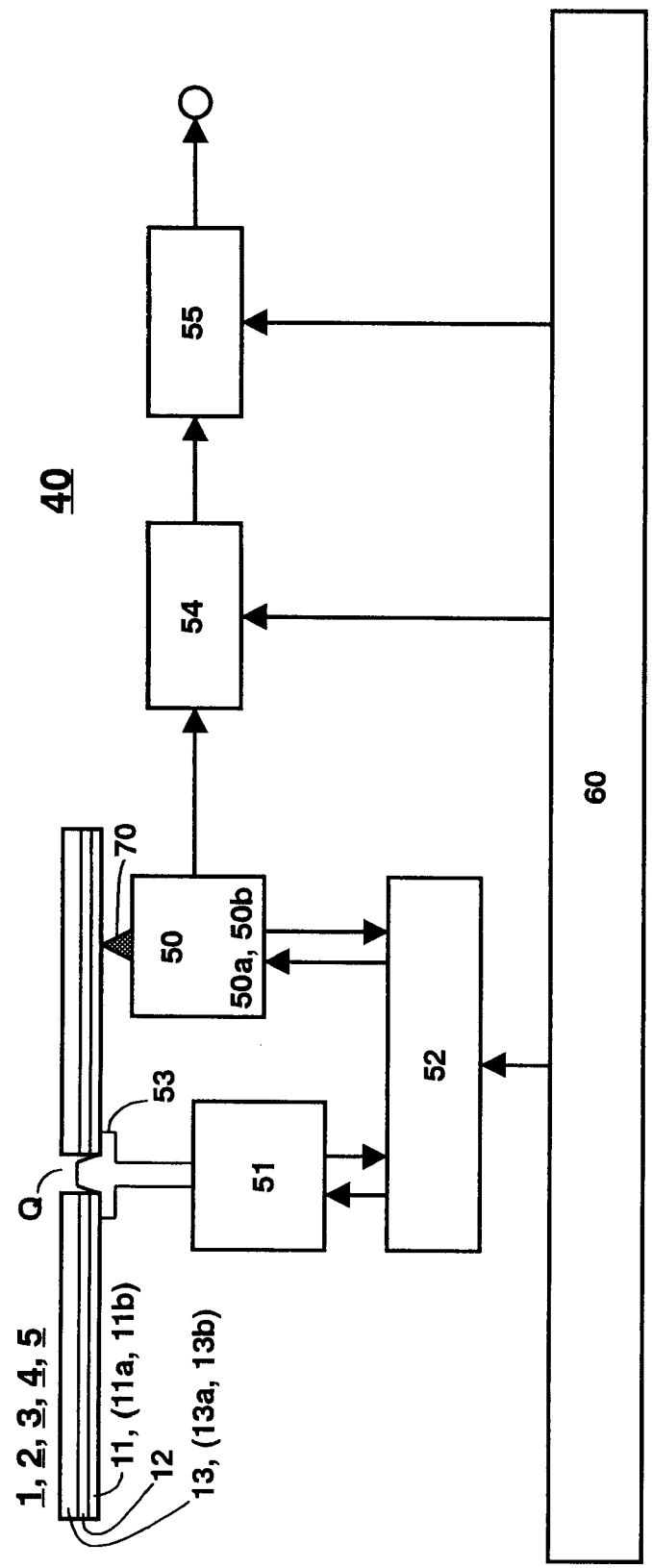
FIG. 15 is a block diagram of a first reproducing apparatus according to the present invention.

A hard coat layer or a lubricative layer (either one is not shown) can be formed on the surface of the light transmission layer 11 opposite to the recording layer 12 for a purpose of reducing an affection caused by an accidental collision of an objective lens, which constitutes a pickup of reproduction apparatus such as shown in FIG. 15, with the light transmission layer 11.

With respect to a material for such a hard coat layer, an actual material having a light transparency of more than 70% for a light beam having a wavelength $\lambda$ is as follows: thermosetting resin, various energy ray curable resin (such as UV ray curable resin, visible light curable resin and electron beam curable resin), moisture curable resin, plural liquid mixture curable resin and solvent containing thermoplastic resin.

The hard coat layer is desirable to exceed a certain value of the "scratch test by pencil" regulated by the Japanese Industrial Standard (JIS) K5400 in consideration of abrasion resistance of the light transmission layer 11. In consideration of that a hardest material of the objective lens is glass, a value of the "scratch test by pencil" for the hard coat layer is most preferable to be more than the "H" grade. If the test value is less than the "H" grade, dust caused by scraping the hard coat layer is remarkably generated. Consequently, an error rate is deteriorated abruptly.

Further, a thickness of the hard coat layer is desirable to be more than 0.001 mm in consideration of shock resistance, more desirable to be less than 0.01 mm in consideration of warp of an information recording medium in total. With respect to a coating method of the hard coat layer, such a method as spin coat, splay, dip, blade coat, roll coat, knife coating, screen printing and offset printing can be used.

With respect to other materials for the hard coat layer, an element having a light transparency of more than 70% for a light beam having a wavelength λ and having a value of the "scratch test by pencil" of more than the "H" grade such as carbon, molybdenum and silicon, and their alloy (including composition such as oxide, nitride, carbide, sulfide and fluoride) can be used (its film thickness is within a range of 1 to 1000 nm). With respect to a forming method of the hard coat layer, such methods as vacuum deposition of resister heating type or electron beam type, direct current sputtering, high frequency sputtering, reactive sputtering, ion beam sputtering, ion plating and chemical vapor deposition (CVD) can be used.

With respect to an actual material for the lubricative layer, lubricant of which surface energy is adjusted by modifying hydrocarbon macromolecule with silicon and fluorine can be used. Further, a thickness of the lubricative layer is desirable to be within a range of 0.1 to 10 nm approximately. With respect to a coating method of the lubricative layer, such a method as spin coat, splay, dip, blade coat, roll coat, knife coating, screen printing and offset printing can be used.

A label printing can be performed on the surface of the substrate 13 although not shown in any drawings. Various energy ray curable resins containing pigment and dye (such as UV ray curable resin, visible light curable resin and electron beam curable resin) can be used suitably for the label printing. A thickness of the label printing is preferable to be more than 0.001 mm in consideration of visibility of the printing, more preferable to be less than 0.05 mm in consideration of warp of the information recording mediums 1 through 4 in total. With respect to a printing method, such a method as screen printing and offset printing can be used.

In order to improve easier loading of the information recording mediums 1 through 4 into a reproducing apparatus and protectiveness based on handling them, a constitution containing the information recording medium in a cartridge can be considered.

Further, in a case that the information recording mediums 1 through 4 are in a disc shape, its dimensions are not limited. Various sizes, for example, 20 to 400 mm in diameter can be acceptable, in any diameter such as 32, 41, 51, 60, 65, 80, 88, 120, 130, 200, 300 and 356 can also be acceptable.

In order to improve a recording characteristic and reproduction characteristic, the recording layer 12 can be composed of a plurality of thin film materials. Such a recording layer composed of a plurality of thin film materials will be detailed in the following embodiment.

[Fifth Embodiment]

Figure 8:
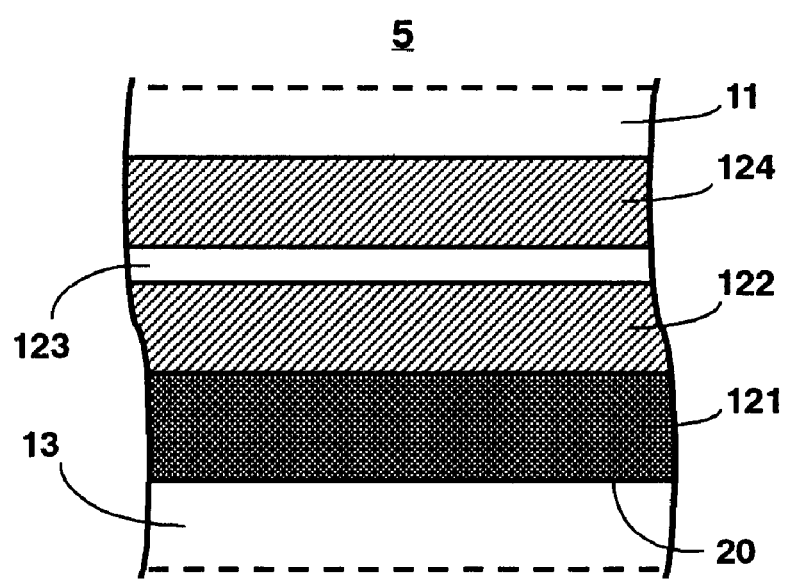
FIG. 8 is a cross sectional view in partially enlarged of an information recording medium according to a fifth embodiment of the present invention.

With referring to FIG. 8, an information recording medium of which recording layer is composed of four layers of thin film materials according to a fifth embodiment of the present invention is explained.

FIG. 8 is a cross sectional view in partially enlarged of an information recording medium according to a fifth embodiment of the present invention.

In FIG. 8, a same composition as that of the first embodiment shown in FIG. 3 is indicated by a same sign as that of the first embodiment and its explanation is omitted.

As shown in FIG. 8, an information recording medium 5 is composed of a reflective layer 121, a first protective layer 122, a recording layer 123, a second reflective layer 124 and a light transmission layer 11, which are laminated on a substrate 13 having a microscopic pattern 20 in order.

With respect to a material of the reflective layer 121, there is provided a metal having a light reflectiveness such as Al, Au and Ag, an alloy containing the metal as a main component and an additive element such as more than one kind of metal or semiconductor and a mixture of a metal such as Al, Au and Ag with a metal compound such as metal nitride, metal oxide and metal chalcogenide. A metal such as Al, Au and Ag and an alloy containing the metal as a main component are high in reflectiveness and thermal conductivity. Therefore, such a metal and alloy are preferable to be used.

Further, the reflective layer 121 has a role of optimizing thermal conduction while recording onto the recording layer 123. Therefore, it can be called a heat sink layer.

With respect to the alloy mentioned above, there is provided an alloy of adding at least one element out of Si, Mg, Cu, Pd, Ti, Cr, Hf, Ta, Nb, Mn, Zr and Rh as an additive element to Al or Ag within a range of more than 1 atomic % and less than 5 atomic % in total or another alloy of adding at least one element out of Cr, Ag, Cu, Pd, Pt and Ni to Au within a range of more than 1 atomic % and less than 20 atomic %. Particularly, the reflective layer 121 is desirable to be constituted by any of Al—Cr alloy, Al—Ti alloy, Al—Ta alloy, Al—Zr alloy, Al—Ti—Cr alloy or Al—Si—Mn alloy, which contains Al as a main component and an additive element controlled within a range of more than 0.5 atomic % and not more than 3 atomic % in total, because they are excellent in corrosion resistance and improve repetition ability.

With respect to an additive element, adding a metal or a semiconductor is more preferable than a metal alone, because a crystalline particle becomes smaller and a noise level decreases when reproducing. Further, adding an additive is better so as to improve stability in an ambience of high temperature and high humidity.

Such an additive is an alloy such as Al—Ti, Al—Cr, Al—Zr, Al—Si, Ag—Pd—Cu and Ag—Rh—Cu. In a case of using a blue semiconductor laser having a wavelength of approximately 400 nm, using an alloy such as Al-system and Ag-system can obtain higher reflectivity. With respect to a thickness of the reflective layer 121, it is more than 10 nm and less than 300 nm.

The film thickness of the reflective layer 121 varies by a thermal conductivity of a metal or an alloy constituting the reflective layer 121. In a case of an Al—Cr alloy, for example, thermal conductivity decreases in response to increasing content of Cr. Therefore, it does not conform to a recording strategy unless the film thickness of reflective layer 121 is thickened. In a case of increasing content of Cr, the recording layer 123 becomes easy to be heated and hard to be cooled, that is so called, to be a gradually cooling structure. In order to control forming a record mark by the recording strategy, some idea such as shortening a head pulse, shortening multi-pulse or extending a cooling pulse is required.

If a thickness of the reflective layer 121 exceeds 50 nm, the reflective layer 121 does not change optically and does not affect a value of reflectivity. However, affection to a cooling speed becomes larger. Since it takes more time to manufacture the thicker reflection layer 121 having a thickness of more than 300 nm, the film thickness of reflection layer 121 must be controlled, if possible, by using a material having a higher thermal conductivity.

If the reflective layer 121 is divided into two layers or more, a noise level can be reduced when reproducing the information recording medium 5. Such a recording layer is formed, for example, as follows:

By using a single disc sputtering system, which forms each film on each layer in a plurality of vacuum chambers, in a case of forming the reflective layer 121 having a thickness of 150 nm in total by transporting the substrate 13 one by one, a first reflective layer is formed in a first vacuum chamber at a filming speed of 2 nm/s, and then second and third reflective layers are formed by second and third vacuum chambers respectively at a filming speed of 6.5 nm/s. Consequently, discs can be filmed one after another in a short period of time as long as 10 seconds. A crystalline particle can be made finer by changing a filming speed, so that a noise level can be reduced when reproducing the information recording medium 5.

The first protective layer 122 and the second protective layer 124 have an effect of protecting the substrate 13 and the recording layer 123 from excessive heat, preventing the substrate 13 and the recording layer 123 from deformation by the heat and preventing a recording characteristic from being deteriorated. Consequently, the first and second protective layers 122 and 124 have an effect of improving a signal contrast by an optical interference effect while reproducing.

These protective layers 122 and 124 are transparent at a wavelength of a light beam for recording and reproducing and its refractive index "n" is within a range of $1.9 \leq n \leq 2.5$.

The first protective layer 122 and the second protective layer 124 are not required to be a same material and composition. It is acceptable to be constituted by different materials. A thickness of the second protective layer 122 decides a wavelength exhibiting a minimum value of spectral reflectance.

Further, the first protective layer 122 and the second protective layer 124 have a further effect of activating crystallization of a recording layer and increasing an erase ratio. With respect to a material of these first and second protective layers 122 and 124, there is existed an inorganic thin film such as ZnS, $SiO_2$, silicon nitride and aluminium oxide.

Particularly, a thin film of oxidized metal or semiconductor such as Si, Ge, Al, Ti, Zr and Ta, a thin film of nitride metal or semiconductor such as Si, Ge and Al, a thin film of carbide metal or semiconductor such as Ti, Zr, Hf and Si, a thin film of sulfide metal or semiconductor such as ZnS, $In_2S_3$, $TaS_4$ and $GeS_2$ and a film of a mixture containing more than two compounds out of the above-mentioned compounds such as oxide, nitride, carbide and sulfide are desirable for the first and second protective layers 122 and 124 because they are high in heat resistance and chemically stable.

Furthermore, with respect to a material of the first and second protective layers 122 and 124, it is desirable that the material does not diffuse into the recording layer 121. These compounds of oxide, sulfide, nitride and carbide are not necessary to be a stoichiometrical composition. Controlling a composition and using them by mixing are also effective for controlling a refractive index. By changing a content amount of oxygen, sulfur, nitrogen and carbon, a refractive index "n" is controlled. If a content amount of them increases, a refractive index decreases.

A mixture film of ZnS and $SiO_2$ is particularly desirable for a material of the first and second protective layers 122 and 124, because recording sensitivity and C/N (carrier to noise ratio) are barely deteriorated by repetitions recording and reproducing. A thickness of the first protective layer 122 and the second protective layer 124 are within a range of 10 to 500 nm respectively. The thickness of the first protective layer 122 is desirable to be within a range of 10 to 50 nm so as to be excellent in a recording characteristic such as C/N and erase ratio and to be rewritable stably a plurality of times.

If a thickness of the first protective layer 122 is thinner, a reflectivity increases and a recording sensitivity decreases. Further, a space between the first protective layer 122 and the reflective layer 121 becomes narrower and the first protective layer 122 becomes a rapid cooling construction, so that a relatively large recording power is necessary to forming a record mark. On the contrary, if the thickness of first protective layer 122 becomes thicker, the space between the first protective layer 122 and the reflective layer 121 becomes wider and the first protective layer 122 becomes a gradually cooling structure. Consequently, a rewriting performance is deteriorated and a repetition number of overwriting decreases.

A film thickness of the first protective layer 122 is thinner than that of the second protective layer 124, the first protective layer 122 becomes a rapid cooling structure. In order to relieve thermal damage, a film thickness of the first protective layer 122 is desirable to be within a range of 2 to 50 nm. Further, it is preferable that a filming speed of the first protective layer 122 must be slower than that of the second protective layer 124. Consequently, increasing of jitter by rewriting is suppressed and a number of rewriting increases.

With respect to a material of the recording layer 123, the same phase change material as that of the recording layer 12 of the first through fourth embodiment can be used. A film thickness of the recording layer 123 is within a range of 5 to 100 nm, desirably, 10 to 30 nm in order to increase a reproduced signal.

The same material as the first protective layer 122 is used for the second protective layer 124. A thickness of the second protective layer 124 is within a range of 10 to 200 nm. The thickness of the second protective layer 124 is desirable to be within a range of 40 to 150 nm in order to increase a reproduced signal although an optimum film thickness varies by a wavelength of a light source to be used. In a case that a laser beam for recording is blue (having a wavelength of 400 nm approximately), a modulated amplitude can be increased if the film thickness of the second protective layer 124 is set to be 40 to 60 nm.

As mentioned above, according to an aspect of the fifth embodiment of the present invention, recording and reproducing characteristics of the information recording medium 5 can be improved in addition to the effects according to the first through fourth embodiment.

The laminated structure of the protection layers can be applied to the information recording mediums 2 though 4 as well as the information recording medium 1. Further, in order to improve the recording and reproducing characteristics more, an auxiliary thin film can be formed on each layer or between layers.

As mentioned above, according to the first through fifth embodiment of the present invention, recording in either the groove section G or the land section L can decrease the cross erase.

Furthermore, for a point of view of signal quality, the information recording medium 5 of the present invention is studied that either of the groove section G and the land section L is more suitable to be recorded. Consequently, it is found that an error rate is low and a rewriting characteristic is excellent when recorded in the land section L.

In consideration of the allocation of the land section L, which is allocated in a closer side to the light transmission layer 11 than the groove section G, and a reproduction light, which enters in from the light transmission layer 11, it is understood that the area of the land section L has a nature of ideally recording a record mark in a uniform shape as well as can easily accumulate heat in a material of the land section L and becomes higher sensitivity. (On the other hand, in a case of recording in the groove section G, heat is easily radiated. Therefore, it is understood that an ideal recording can hardly be performed.)

A modulation pattern for embedding an auxiliary information (sub information) such as address data in analog or digital with respect to the information recording medium 1 according to the present invention is detailed next.

The auxiliary information (sub information) is recorded in a form of wobbled pattern by the method of amplitude modulation (AM), frequency modulation (FM) or phase modulation (PM) as mentioned above. In other words, the auxiliary information is directly recorded (on the substrate 13 or the light transmission layer 11 and formed in a shape of groove) as a wobbling pattern. Therefore, the auxiliary information is a permanent information being disabled to rewrite.

In a case that the information recording medium 1 is in a disc shape, the auxiliary information is recorded in a wobbling form with respect to a groove, which extends to the tangential direction of the disc. Consequently, the wobbling direction is the radial direction of the disc.

An address data, which is one of the auxiliary information (sub information) to be recorded in the present invention, is a date selected out of an absolute address, which is assigned to whole the information recording medium 1, a relative address, which is assigned to a partial area, a track number, a sector number, a frame number, a field number, a time information and a error correction code. It is a data, which is converted from a data described in the decimal notation or the hexadecimal notation, for example, to the binary notation (including the BCD code and gray code).

Further, an auxiliary information other than an address data can also be handled. Such an auxiliary information is a specific code data, which is at least selected out from information and data such as, for example, a type of information recording medium, a size of the information recording medium, an ideal recording capacity of the information recording medium, an ideal linear recording density of the information recording medium, an ideal linear velocity of the information recording medium, a track pitch of the information recording medium, a recording strategy information, a reproducing power information, a manufacturer information, a manufacturing number, a lot number, a control number, a copyright related information, a key for producing a cipher, a deciphering key, a ciphered data, a recording permission code, a recording refusal code, a reproduction permission code and a reproduction refusal code. It is also acceptable that these data are accompanied by an error correction code.

In order to simplify explanation, hereinafter it is explained with assuming that an auxiliary information (sub information) is an address.

Figure 9:
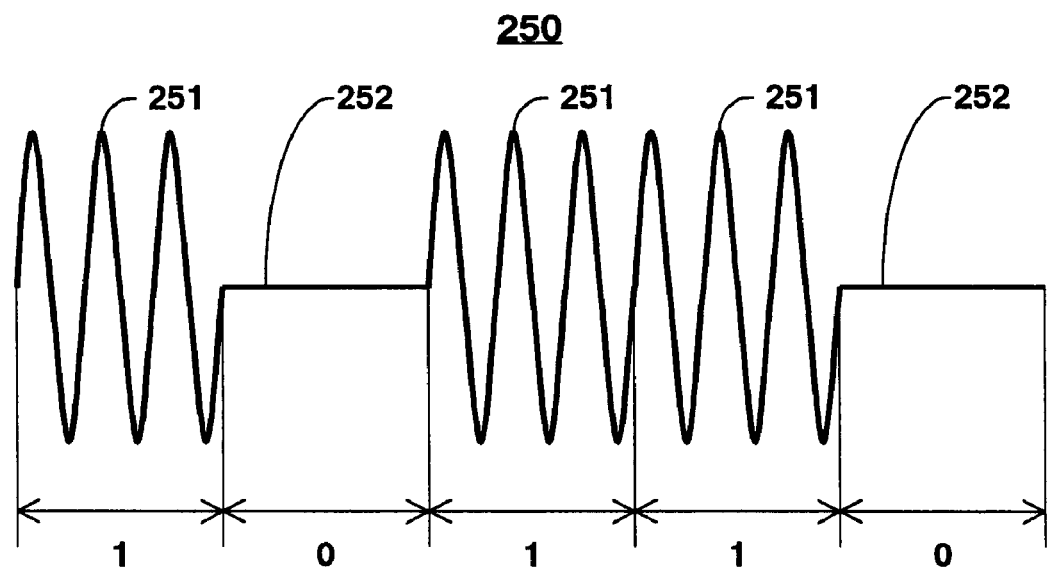
FIG. 9 is a fragmentary plan view, partially enlarged, of an amplitude modulation address recorded in an information recording medium according to the present invention.

FIG. 9 is an enlarged plan view of an address 250 recorded by the amplitude modulation (AM) method in an information recording medium according to the present invention. The address 250 is recorded in shape partially or totally onto either the groove section G or the land section L, which constitutes the microscopic pattern 20. In the AM method, a data "1" or "0" is recorded in accordance with an amplitude whether or not it is existed. In a case of FIG. 9, a data "1" is recorded as a section 251 having amplitude and another data "0" as another section 252 having no amplitude.

In a case that an address "10110", for example, is recorded, as shown in FIG. 9, the section 251, the other section 252, the section 251, the section 251 and the other section 252 are sequentially recorded in shape. Such a recording method of data in response to amplitude whether or not it is existed is advantageous to be able to demodulate even in a deteriorated C/N circumstance because the AM method is a simple signal format system. Particularly, affection of crosstalk from an adjacent track can be minimized Consequently, the AM method is an effective address recording method for the information recording medium 1 according to the present invention reducing the pitch P more than the spot diameter S of a light beam for reproduction.

Each duration of the section 251 and the other section 252 is acceptable to be either the same duration or not. However, the duration is desirable to be the same in order to make an error rate of demodulation the best. Further, a number of waves constituting the section 251 is not limited to one specific number. The number must be plural in order to eliminate a readout error, and a number being not redundant is suitable for the number of waves so as not to decrease a recording density of address recording. From the point of view of the above-mentioned circumstances, the number of waves is desirable to be 2 to 10 approximately. Furthermore, each amplitude of a plurality of the sections 251 can be different from each other. However, it is desirable to be the same in consideration of easier setting of a slice level when demodulating.

In a case that an extra area recorded with a single frequency for clock other than the address 250 is provided, it is not concerned whether or not the single frequency is the same as a frequency of the section 251. However, if it is the same frequency, a physical length used for extracting clock can be extended slightly. Consequently, the same frequency is advantageous for stable extraction of clock to be easier.

Figure 10:
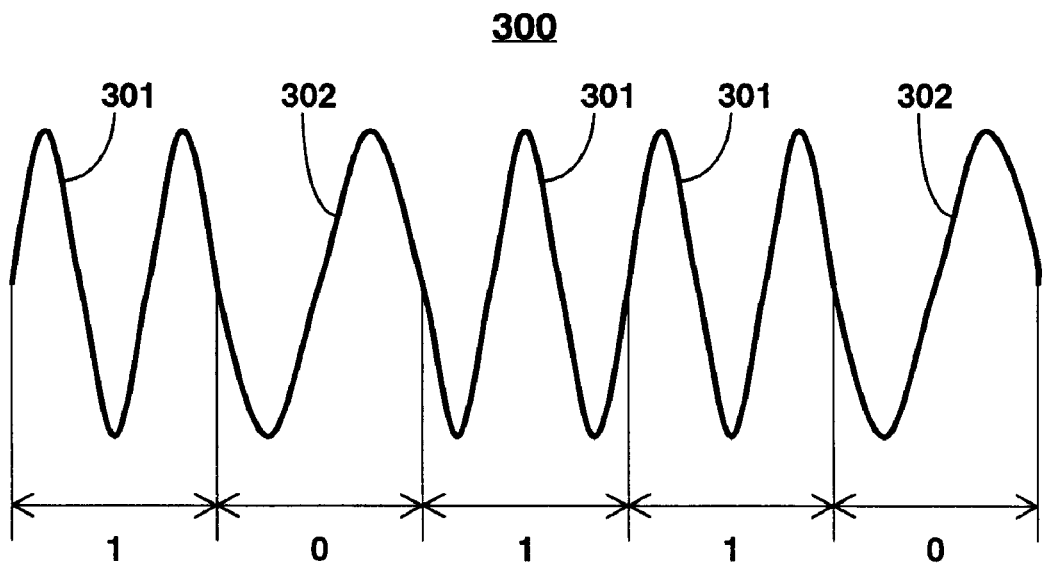
FIG. 10 is a fragmentary plan view, partially enlarged, of a frequency modulation address recorded in an information recording medium according to the present invention.

FIG. 10 is an enlarged plan view of an address 300 recorded in an information recording medium according to the present invention by the frequency modulation (FM) method. The address 300 is recorded in shape partially or totally onto either the groove section G or the land section L, which constitutes the microscopic pattern 20. In the FM method, a data "1" or "0" is recorded in accordance with a frequency whether it is higher or lower. In a case of FIG. 10, a data "1" is recorded as a section 301 having a higher frequency and another data "0" as another section 302 having a lower frequency.

In a case that an address "10110", for example, is recorded, as shown in FIG. 10, the section 301, the other section 302, the section 301, the section 301 and the other section 302 are sequentially recorded in shape.

Such a recording method of data in response to a frequency whether it is higher or lower is advantageous to be able to demodulate by a simplified circuitry. Particularly, as shown in FIG. 10, by selecting a proper phase, which is suitable for two waves to be connected continuously at a point where their frequencies change over, a reproduction envelope becomes approximately constant and stable address extraction can be realized. Each duration of the section 301 and the other section 302 is acceptable to be either the same duration or not. However, the duration is desirable to be the same in order to make an error rate of demodulation the best.

A number of waves constituting the section 301 and the other section 302 is arbitrary. Further, each amplitude of the section 301 and the other section 302 can be different from each other. However, it is desirable to be the same amplitude in consideration of easier demodulation. Furthermore, selecting a frequency of the section 301 and the other section 302 is arbitrary. However, it is desirable to assign the two frequencies of which phase difference is within a range of $\pm\pi/12$ to $\pm\pi/0.75$. Particularly, in a case that a frequency ratio (of higher frequency to lower frequency) is assigned to be 1.5 as shown in FIG. 10, the two frequencies are related to that a phase of each wave is shifted by $-\pi/2.5$ and $+\pi/2.5$ respectively. These two frequencies can be expressed in integral multiples (triple and twice hereat) of a single frequency (0.5 hereat). Consequently, there is existed an advantage of constituting a demodulation circuit simply. Moreover, a demodulation can be performed by the synchronous detection method, so that an error rate can be reduced remarkably.

In a case that a frequency ratio (of higher frequency to lower frequency) is assigned to be 1.28 as another example, the two frequencies are related to such that a phase of each wave is shifted by $-\pi/4$ and $+\pi/4$ respectively. Consequently, in this case, a demodulation can also be performed by the synchronous detection method, so that an error rate can be reduced remarkably.

In a case that an extra area recorded with a single frequency for clock other than the address 300 is provided, it is acceptable that the single frequency and frequencies of the section 301 and the other section 302 are different frequencies from each other. However, a physical length used for extracting clock can be extended slightly if either frequency of the section 301 and the other section 302 is the same as that of the single frequency. Consequently, the same frequency is advantageous for stable extraction of clock to be easier.

Figure 11:
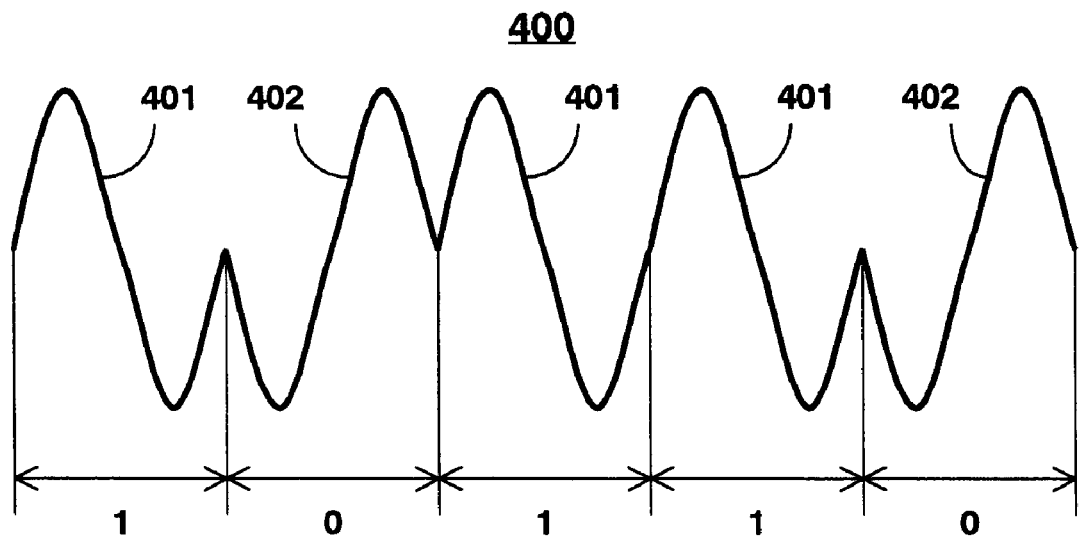
FIG. 11 is a fragmentary plan view, partially enlarged, of a first phase modulation address recorded in an information recording medium according to the present invention.

FIG. 11 is an enlarged plan view of a first phase modulation (PM) address 400 recorded in an information recording medium according to the present invention. The first PM address 400 is recorded in shape partially or totally onto either the groove section G or the land section L, which constitutes the microscopic pattern 20. In the PM method, a data "1" or "0" is recorded in accordance with a phase difference. In the case of FIG. 11, a data "1" is recorded as a "sine 0" section 401 and another data "0" as a "sine $\pi$" section 402. Further, in a case that an address "10110", for example, is recorded, as shown in FIG. 11, the "sine 0" section 401, the "sine $\pi$" section 402, the "sine 0" section 401, the "sine 0" section 401 and the "sine $\pi$" section 402 are sequentially recorded in shape.

Such a recording method of data in response to a phase difference is advantageous to be able to reproduce by demodulating by the synchronous detection method even in a deteriorated C/N circumstance. Each duration of the "sine 0" section 401 and the "sine $\pi$" section 402 is acceptable to be either the same duration or not. However, the duration is desirable to be the same in order to make an error rate of demodulation the best. Further, each amplitude of the "sine 0" section 401 and the "sine $\pi$" section 402 can be different from each other. However, it is desirable to be the same amplitude in consideration of easier demodulation.

Furthermore, a phase difference between two data is assigned to be $\pi$ and the two data are recorded in two values of "0" and $\pi$. However, it is not limited to "0" and $\pi$. For example, with assigning that a phase difference is $\pi/2$, it is acceptable to be recorded in four values of $-3\pi/4$, $-\pi/4$, $+\pi/4$ and $+3\pi/4$.

In a case that an extra area recorded with a single frequency for clock other than the first PM address 400 is provided, it is acceptable that the single frequency and a frequency of either the "sine 0" section 401 or the "sine $\pi$" section 402 are different from each other. However, a physical length used for extracting clock can be extended slightly if these frequencies coincide with each other. Consequently, the same frequency is advantageous for stable extraction of clock to be easier.

Further, the single frequency for clock can be recorded by superimposing on the first PM address 400. In other words, an integral multiples (including one) or one over integral multiples of frequency can be superimposed on a PM address. In a case of superimposing a clock frequency as mentioned above, frequencies can be separated by using a commonly known band pass filter. However, it is desirable that frequency difference between the first PM address 400 and a clock frequency is larger. For example, with assuming that a frequency of the first PM address 400 is "1" and a clock frequency is ½, these frequencies are ideally separated and both address and clock can be extracted stably.

Figure 12:
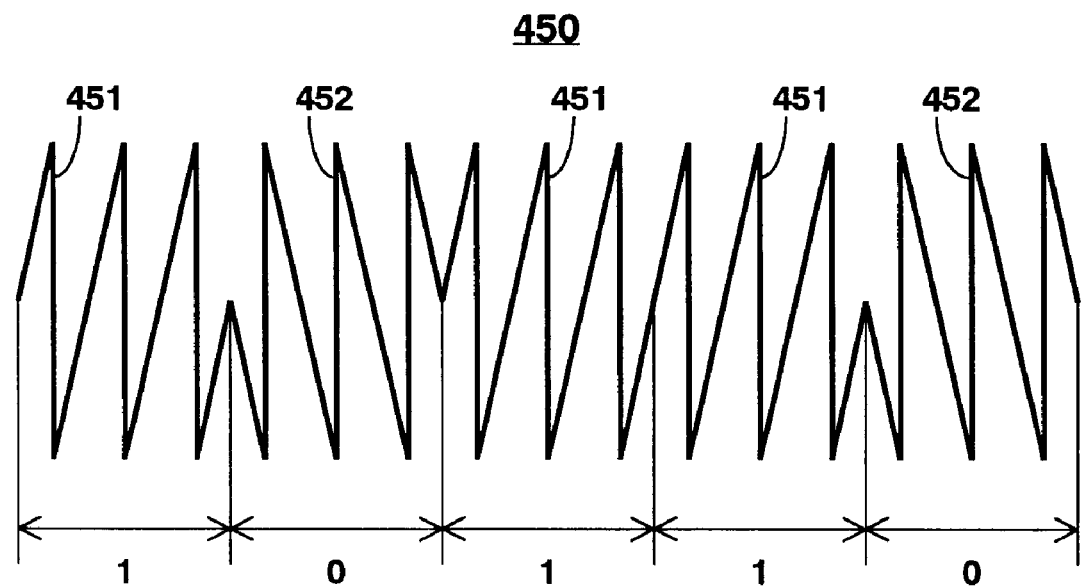
FIG. 12 is a fragmentary plan view, partially enlarged, of a second phase modulation address recorded in an information recording medium according to the present invention.

FIG. 12 is an enlarged plan view of a second phase modulation (PM) address 450 recorded by the PM method. A shape is recorded in either the groove section G or the land section L constituting the microscopic pattern 20. In this method, a wave is regarded as an asymmetrical shape of rising and falling. Phase difference is expressed by controlling each wave individually. That is, in a case of FIG. 12, the data "1" is recorded as a section 451 of which a wave rises gradually and falls rapidly (hereinafter referred to as a rapidly falling section 451), and the data "0" as a section 452, which rises rapidly and falls gradually (hereinafter referred to as a rapidly rising section 452).

In a case that an address "10110", for example, is recorded, as shown in FIG. 12, the rapidly falling section 451, the rapidly rising section 452, the rapidly falling section 451, the rapidly falling section 451 and the rapidly rising section 452 are sequentially recorded in shape.

Such a recording method of data in response to a phase difference is advantageous to be able to demodulate by inputting into a wide-band filter and extracting a differential component even in a deteriorated C/N circumstance. Each duration of the rapidly falling section 451 and the rapidly rising section 452 is acceptable to be either the same duration or not. However, the duration is desirable to be the same in order to make an error rate of demodulation the best.

Each amplitude of the rapidly falling section 451 and the rapidly rising section 452 can be different from each other. However, it is desirable to be the same amplitude in consideration of easier demodulation. Further, in a case that an extra area recorded with a single frequency for clock other than the second PM address 450 is provided, it is acceptable that the single frequency and a frequency of either the rapidly falling section 451 or the rapidly rising section 452 are different from each other. However, a physical length used for extracting clock can be extended slightly if these frequencies coincide with each other. Consequently, the same frequency is advantageous for stable extraction of clock to be easier.

In the explanation of recording methods by the AM, FM and PM heretofore, it is explained by using the recording method, which records an address data itself as a shape of wobbling groove directly. Further, a fundamental wave of wobbling groove is on the assumption of a sinusoidal shape. However, the shape according to the present invention is not limited to the sinusoidal shape. For example, it is apparent that the same effect is recognized by using a cosine shape for the fundamental wave of wobbling groove.

An address data can also be recorded in multiple recording and time sharing recording by a different modulation method. For example, it can be recorded by synthesizing different methods such as AM+FM, AM+PM and FM+PM. Further, it can be recorded by a time sharing recording method such as recording for a period of time by the AM and for another period of time by the FM, recording for a period of time by the AM and for another period of time by the PM or recording for a period of time by the FM and for another period of time by the PM. As mentioned above, it is also acceptable that a single frequency area for extracting a clock is recorded for a certain period of time being different from the period for recording the address data as a time sharing recording method in addition to the time sharing recording of the address data.

With respect to an amplitude of wobbling groove, by assigning a deflection amplitude by wobbling s as to be less than the pitch P, excellent reproduction of address can be realized. Actually, an address, which does not contact with an adjacent track physically, can be recorded by assigning amplitude by wobbling to be less than the pitch P, so that crosstalk caused by recording can be eliminated.

By attempting such that writing a random data by the phase change recording in a groove, which is recorded with an address with assigning such a wobble amplitude to be less than the pitch P, and then reproducing the address by the push-pull method, it is found that a wobble amplitude (peak to peak) is more than 2% of the spot diameter S of light beam for reproduction as a limit possible to detect the address signal. Further, it is found that a random data caused by the phase change recording is remarkably superimposed as a noise and an address error rate increases suddenly with respect to a groove formed such that the wobble amplitude is less than 2% of the spot diameter S.

On the other hand, in a case that the wobble amplitude is more than 9% of the spot diameter S, crosstalk from an adjacent track is remarkably superimposed on a push-pull signal and an address error rate increases suddenly. Consequently, a wobble amplitude is essential to be less than the pitch P. Further, it is most suitable for the wobble amplitude to be within a range of 2 to 9% of the spot diameter S of light beam for reproduction.

In the present invention, the recording method is not limited to the direct recording. In a case of recording a long array of address data, it is possible that a plurality of "0"s or a plurality of "1"s is arranged sequentially and a direct current component is generated in the data by the direct recording method.

In order to eliminate such possibility, it is acceptable to perform a method such that the data is previously modulated by the base-band modulation and recorded. In other words, the method is that replace "0" and "1" with another code previously and reduce a sequence of "0"s and "1"s to a certain number or less. With respect to such a method, the method such as Manchester code, PE (phase encoding) modulation, MFM (modified frequency modulation), M2 (Miller squared) modulation, NRZI (non return to zero inverted) modulation, NRZ (non return to zero) modulation, RZ (return to zero) modulation and differential modulation can be used alone or by combining some of them.

FIG. 13 is a table exhibiting a change of fundamental data of before and after a base-band modulation.

With respect to a base-band modulation method, which is most suitable for the information recording medium 1 of the present invention, it is the Manchester code (biphase modulation) method. The Manchester code method is a method of applying 2 bits to each one bit of data to be recorded as shown in FIG. 13. That is, "00" or "11" is assigned to a data "0" to be recorded, and "01" or "10" to a data "1". Further, an inverted code of inverting a last code of preceding data is essentially applied to a head code of succeeding data when arranging the succeeding data after the preceding data.

FIG. 14 is a table of definite example exhibiting a change of data array of before and after a base-band modulation. As shown in FIG. 14, an address data "100001" is assigned to be a code array of "010011001101". The original address data contains a sequence of four "0"s. Further, the original address data is an asymmetrical data that an appearing probability of "0" is twice that of "1". If such an asymmetrical data is modulated, a sequence of "0" or "1" is two maximally and the original data is converted into a symmetrical data having equal appearing probability of "0" and "1". As mentioned above, the base-band modulation, which restricts a sequence of same bits within a certain quantity, is effective to increase stability of reading out a data. Consequently, the base-band modulation method is suitable for pre-treatment for a long address data.

Further, there is existed another method of highly analyzing an address data and recording it in dispersion. For example, in combination with a dummy data "10", it is a recording method such that an address data is recorded as a data array of "10X", wherein "X" is either "0" or "1", and the data array is allocated at every certain interval. If the "X" is extracted by using the dummy data "10" as a data trigger, the original data can be restored. This method is effective for a format, which can be read a data array to be treated with taking a long period of time.

With respect to another example of the dispersion recording, there is existed a method such that a first specific data pattern ("101", for example), which is easy to read, is allocated (recorded) at every certain interval, and then a second specific data pattern ("1111", for example), which is easy to read, is allocated between the first specific data patterns. A position of allocating the second specific pattern is advanced to a predetermined distance (time) with respect to the first specific pattern. The second specific pattern is recorded as a data "1" if the other second specific patter is existed at the position. If the other second specific patter is not existed at the position, a data "0" is recorded there.

When reading a data, with paying attention to a predetermined position, the second specific pattern can be read out whether or not it is existed. By following such a method, a recorded address data can be read out. Further, by assigning two positions of allocating the second specific pattern previously, which are advanced to a predetermined distance (time) with respect to the first specific pattern, a data "1" or "0" can be recorded at either position, where the second specific patter exists.

The dispersion recording method by using a difference in distance between the first specific pattern and the second specific pattern is explained above. However, in a case that a pattern having extremely high accuracy in readout can be provided for a specific pattern, the first specific pattern and the second specific pattern are acceptable to be identical with each other. With respect to a specific pattern recorded by a certain period of time interval, it is acceptable that the data "1" and the data "0" are identified by extracting another specific pattern having a shorter time interval than the specific pattern and measuring the time interval.

The recording of an auxiliary information (sub information) composed of an address information and a specific code data by wobbling groove is explained hereinbefore. Although it is repeated once again, the recording explained herein is recording in shape by wobbling of a groove (the groove section G or the land section L) not recording onto the recording layer 12. The recording in shape by wobbling groove of the auxiliary information and the clock information (single frequency for extracting clock) mentioned above is a permanent information, which can not be altered and is high in concealment. Such recording can be performed by applying a method of forming a record accompanying shape change on the substrate 13 or the light transmission layer 11.

The forming a record is realized by using a stamper recorded with wobbling groove. The stamper itself is manufactured by the so-called mastering method for forming a wobbling pattern by using an energy ray.

In the meantime, as mentioned above, recording onto the recording layer 12 (phase change recording, for example) is applied to the groove section G or the land section L. When recording onto the recording layer 12, the recording is performed with referring to an auxiliary information and a clock information recorded by wobbling groove (for example, recording with reading an address). Therefore, a track applied for recording must coincide with another track recorded in shape with an auxiliary information and a clock information.

For example, if a track applied for recording is the land section L, another track recorded in shape with the auxiliary information and the clock information must be the land section L. If they are different from each other, the auxiliary and clock information are extracted with mixing with 50% each of information recorded in adjacent two tracks, so that accurate auxiliary information and clock information can not be extracted, although recording onto the recording layer 12 can be physically performed without any problem.

In another case, if a track applied for recording is the land section L and another track recorded in shape with an auxiliary information and a clock information is the groove section G, recording onto the land section L in the recording layer 12 is naturally performed. However, if the auxiliary information such as an address and the clock information are extracted while recording, an information recorded in two adjacent groove sections G, which sandwich the land section L, is read out. Consequently, the auxiliary and clock information are extracted with mixing with 50% each of auxiliary information and clock information recorded in two adjacent groove sections G different from the original groove section G.

It is impossible to separate the mixed two information, so that recording onto a track intended to be recorded can not be performed. Accordingly, a track applied for recording is necessary to coincide with another track recorded in shape with an auxiliary information and a clock information.

As mentioned above, recording onto the recording layer 12 is suitable to record on the land section L in a sense of decreasing an error rate. Therefore, it is most desirable that a track supplied for recording is the land section L and another track recorded in groove shape with an auxiliary information and a clock information is also the land section L.

With referring to FIG. 15, a first reproducing apparatus 40 utilized for reproducing the information recording mediums 1 through 5 is explained next.

FIG. 15 is a block diagram of a first reproducing apparatus according to the present invention.

In order to simplify an explanation, hereinafter the information recording medium 1 represents the information recording mediums 1 through 5 generically.

As shown in FIG. 15, a first reproducing apparatus 40 is at least composed of a pickup 50 for reading out reflected light from the information recording medium 1, a motor 51 for rotating the information recording medium 1, a servo device 52 for controlling to drive the pickup 50 and the motor 51, a turntable 53 for supporting the information recording medium 1, a demodulator 54 for demodulating an information signal read out by the pickup 50, an interface (I/F) 55 for transmitting a signal demodulated by the demodulator 54 externally and a controller 60 for controlling the first reproducing apparatus 40 totally. The demodulator 54 is a digital converter, which restores a 16-bit data to an original 8-bit data, in a case of the 8/16 modulation (Eight to Fifteen Modulation Plus: EFM Plus) method utilized in the DVD system, for example.

The turntable 53 and the information recording medium 1 are connected with plugging a center hole Q of the information recording medium 1 with the turntable 53. Such a connection between the turntable 53 and the information recording medium 1 can be either a fixed connection or semi-fixed connection, which can load or release the information recording medium 1 freely. Further, the information recording medium 1 can be installed in a cartridge. With respect to a cartridge, a commonly known cartridge having an opening and closing mechanism in the center can be used as it is.

The motor 51 is linked to the turntable 53, supports the information recording medium 1 through the turntable 53 and supplies relative motion for reproduction to the information recording medium 1. A signal output can be supplied to a not shown external output terminal or directly supplied to a not shown display device, audio equipment or printing equipment.

The pickup 50 is further composed of a light emitting element 50a, which irradiates a light beam having a single wavelength $\lambda$ within a range of 350 to 450 nm, desirably 400 to 435 nm, an objective lens 50b having a numerical aperture NA within a range of 0.75 to 0.9 and a not shown photo detector, which receives a reflected light reflected by the information recording medium 1. Furthermore, the pickup 50 forms a reproducing light 70 in conjunction with these components.

It is acceptable that the light emitting element 50a is a semiconductor laser of gallium nitride system compound or a laser having a second harmonic generating element.

The servo device 52 is indicated just one in FIG. 15. However, it can be divided into two; one is a driving control servo for the pickup 50 and the other is another driving control servo for the motor 51.

A commonly know equalizer and a PRML (partial response maximum likelihood) decoding circuit, both are not shown, can be installed in the demodulator 54. With respect to an equalizer (waveform equalizer), for example, a so-called neural net equalizer (such as disclosed in the Japanese Patent No. 2797035) in which a plurality of conversion systems having a nonlinear input-output characteristic is combined together with applying individual variable weighting and constitutes a neural network, a so-called limit equalizer (such as disclosed in the Japanese Patent Application Laid-open Publication No. 11-259985/1999) in which an amplitude level of reproduced signal is limited to a predetermined value and forwarded to a filtering process, and a so-called error selection type equalizer (such as disclosed in the Japanese Patent Application Laid-open Publication No. 2001-110146) in which an error between a reproduced signal and an objective value for waveform equalization is obtained and a frequency of waveform equalizer is changed adaptively so as to minimize the error can be preferably used.

Further, in the commonly known PRML decoding circuit containing a predicted value controlling and equalization error calculating circuit, a so-called adaptive viterbi decoder (such as disclosed in the Japanese Patent Application Laid-open Publications No. 2000-228064 and No. 2001-186027) in which a predicted value utilized for decoding viterbi algorithm is calculated and a frequency response is optimized so as to minimize an equalization error of waveform equalizer can be suitably used.

Operations of the first reproducing apparatus 40 are explained next.

The reproducing light 70 emitted form the light emitting element 50a of the pickup 50 is converged at the microscopic pattern 20 in the information recording medium 1. Actually, the reproducing light 70 is focused on the microscopic pattern 20, which is allocated at a depth of 0.07 to 0.12 mm equivalent to a thickness of the light transmission layer 11.

Succeedingly, tracking of the reproducing light 70 is performed to either one of the groove section G or the land section L. The tracking is performed with choosing a predetermined side. However, as mentioned above, choosing the land section L is most desirable. A recorded signal is read out by a light detector not shown with receiving a reflected light from the microscopic pattern 20.

The light detector is divided into 4 sections. A total sum signal (that is, Ia+Ib+Ic+Id) of output from all 4 sections of the light detector is transmitted to the demodulator 54, wherein each of Ia, Ib, Ic and Id corresponds to each output of a 4-division light detector for a DVD disc defined by the JIS Standard No. X6241: 1997. Reading out of the recorded signal is performed by reproducing the record mark M recorded in the groove section G or the land section L on the microscopic pattern 20.

It is omitted in the above explanation that a focus error signal is necessary for focusing to be generated and a tracking error signal is necessary for tracking to be generated. Such a focus error signal and a tracking error signal are generated by a differential signal (that is, "(Ia−Ib)−(Ic−Id)") of output from a 4-division light detector in the radial direction and transmitted to the servo device 52.

In accordance with control by the controller 60, in the servo device 52, a focus servo signal and a tracking servo signal are generated from the received focus error signal and the tracking error signal and transmitted to the pickup 50. In the meantime, a rotary servo signal is generated in the servo device 52 and transmitted to the motor 51.

Further, in the demodulator 54, the recorded signal is demodulated and applied with error correction according to demand, and an obtained data stream is transmitted to the I/F 55. Finally, a signal is outputted externally in accordance with control by the controller 60.

As mentioned above, the information recording medium 1 and the first reproducing apparatus 40 according to the present invention are designed for coping with the reproducing light 70, which is produced by the light emitting element 50a having single wavelength λ within the range of 350 to 450 nm and the objective lens 50b having the numerical aperture NA of 0.75 to 0.9. Therefore, the first reproducing apparatus can preferably reproduce the information recording medium 1.

With respect to the light emitting element 50a in the first reproducing apparatus 40, it is defined that the light emitting element 50a can be a semiconductor laser of gallium nitride system compound or a laser having a second harmonic generating element. However, these two different lasers have a characteristic laser noise respectively, particularly, in a case of a semiconductor laser of gallium nitride system compound, it is characterized by a higher noise level.

According to an actual measurement, an RIN (relative intensity noise) of a laser having a second harmonic generating element is −134 dB/Hz. The noise level is almost equivalent to that of a red semiconductor laser (λ=650 nm approximately) utilized for a DVD disc.

On the other hand, in a case of a semiconductor laser of gallium nitride system compound, an RIN is −125 dB/Hz. The noise level is larger than that of a laser having a second harmonic generating element by 9 dB. The noise is added to a reproduced signal from the information recording medium 1 and a S/N of the reproduced signal is extremely deteriorated. In other words, if a semiconductor laser of gallium nitride system compound is adopted for the first reproducing apparatus 40, a signal characteristic is deteriorated. Therefore, it signifies that a designing guide obtained by a DVD disc can not be applied for the first reproducing apparatus 40 with shifting the designing guide proportionally. Consequently, in a case of the first reproducing apparatus 40 having a semiconductor laser of gallium nitride system compound, an information recording medium having a signal characteristic of compensating a deteriorated component is necessary to be provided in consideration of being added with a noise inherent to a laser.

With respect to the information recording medium 5 shown in FIG. 8 according to the fifth embodiment of the present invention, a relationship between modulated amplitude and error rate is examined by manufacturing various kinds of mediums with varying material and thickness of the reflective layer 121, the first protective layer 122, the recording layer 123 and the second protective layer 124 and by reproducing the mediums by using the first reproducing apparatus 40, which is installed with a semiconductor laser of gallium nitride system compound (having a RIN of −125 dB/Hz) for the light emitting element 50a.

In addition thereto, recording on the information recording medium 5 is performed under a most ideal recording condition, which decreases an error rate maximally.

Reproduced modulated amplitude is also called an output of reproduced signal. In a case of a phase change recording material, it is an index having correlation with reflectivity contrast between crystal and amorphous. In more accurately, a modulation signal so-called a (d, k) signal is recorded on the information recording medium 5. A recording apparatus will be explained later.

A fixed length code and a variable length code can be applied for a (d, k) modulation signal. Such a (d, k) modulation as (2, 10) modulation in a fixed length code, (1, 7) modulation in a fixed length code, (1, 9) modulation in a fixed length code, (2, 7) modulation in variable length code and (1, 7) modulation in the variable length code can be suitably used.

Examples representing the (2, 10) modulation in a fixed length code are the 8/15 modulation (such as disclosed in the Japanese Patent Application Laid-open Publication No. 2000-286709), the 8/16 modulation (EFM plus) and the 8/17 modulation (EFM). Further, an example representing the (1, 7) modulation in the fixed length code is the "D1, 7" modulation (such as disclosed in the Japanese Patent Application No. 2001-80205 in the name of Victor company of Japan, Limited). Furthermore, an example representing the (1, 9) modulation in the fixed length code is the "D4, 6" modulation (such as disclosed in the Japanese Patent Application Laid-open Publication No. 2000-332613). Moreover, an example representing the (1, 7) modulation in the variable length code is the 17PP modulation (such as disclosed in the Japanese Patent Application Laid-open Publication No. 11-346154/1999).

Modulated amplitude is obtained from a signal having a maximal length used by a code by reproducing the information recording medium 5 loaded flat (without declining) in the first reproducing apparatus 40 and by connecting a reproduced signal in the DC system outputted from the pickup 50 to an oscilloscope.

In the case of the 8/16 modulation used for a DVD disc, for example, the maximal length is 14T. By measuring an I14L and I14H as specified by the specification (JIS Standard X6241: 1997), modulated amplitude can be obtained by calculating (I14H−I14L)/I14H.

Further, an error rate is obtained by measuring a reproduced signal obtained through the demodulator 54. A result of obtaining modulated amplitude and an error rate is shown in FIG. 16.

Figure 16:
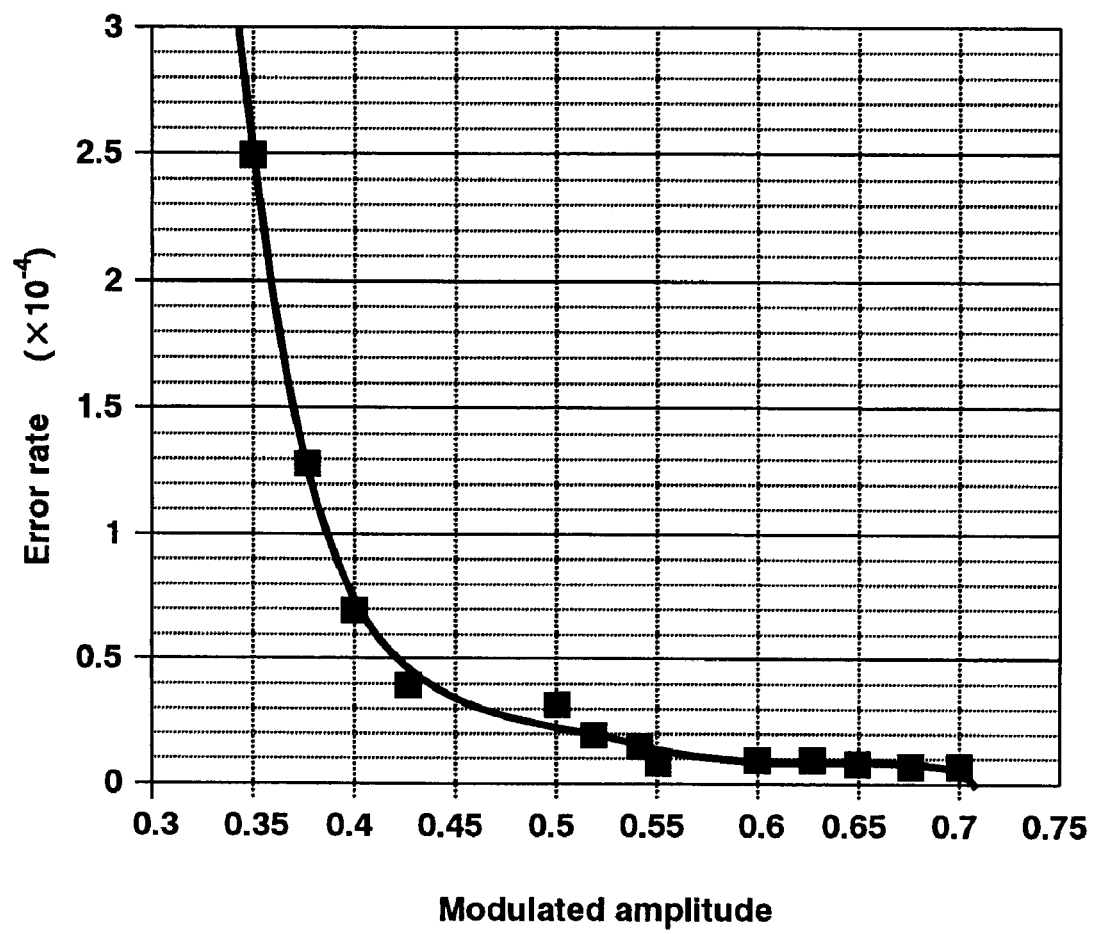
FIG. 16 is a graph exhibiting a relation between modulated amplitude and error rate.

FIG. 16 is a graph exhibiting a relation between modulated amplitude and error rate.

As shown in FIG. 16, there is existed a definite correlation between modulated amplitude and error rate. It is apparent that an error rate remarkably increases in accordance with decreasing modulated amplitude. By assigning a practical error rate to $3 \times 10^{-4}$ defined by a DVD disc or like, a necessary modulated amplitude is more than 0.34.

Further, the information recording medium 5 warps by temperature change or like in circumstances of utilization of the information recording medium 5. Therefore, with assuming that a declination of approximate 0.7 degree is possible to occur as a same situation as a DVD disc, an error rate increases due to coma aberration, which is complexly produced by a wavelength λ within a range of 350 to 450 nm, an NA within a range of 0.75 to 0.9 and a thickness of the light transmission layer 11 within a range of 0.07 to 0.12 mm.

By the result of measurement, it is found that the error rate of $3 \times 10^{-4}$ at the declination of 0.7 degree is equivalent to an error rate of $0.7 \times 10^{-4}$ at the declination of zero degree. In other words, the error rate of $0.7 \times 10^{-4}$ is essential in consideration of a possible declination when using the information recording medium 5 practically. Accordingly, it is understood that practical modulated amplitude is more than 0.4.

As mentioned above, in the case that a semiconductor laser of gallium nitride system compound is used for a light emitting element, an error rate can be reduced to a practical level as low as that of the DVD disc specification if modulated amplitude of the information recording medium 5 is assigned to be more than 0.4 in consideration of a noise being added to a reproduced signal. Further, it is found by experiments that a correlation between modulated amplitude and error rate such as shown in FIG. 16 can be obtained as a similar result by applying any of the modulation methods mentioned above.

A maximum mark length can vary by a modulation method. However, a signal output almost saturates at more than 6T by these modulation methods and converges to a certain value. Consequently, modulated amplitude obtained by recording the information recording medium 1 by the 17PP modulation method, for example, and another modulated amplitude obtained by the 8/16 modulation method become a same value as each other. Modulated amplitude by the (1, 7) system modulation method such as the "D1, 7" modulation method and the 17PP modulation method can be obtained by (I8H−I8L)/I8H because the maximum mark length becomes 8T.

Hereinafter, information recording mediums according to embodiments 1 through 5 are more actually explained. In addition thereto, samples of information recording mediums according to comparative examples 1 through 3 are also manufactured in order to compare.

[Embodiment 1]

Polycarbonate having a thickness of 1.1 mm is used for a substrate 13 of a phase change type information recording medium 5. Further, the information recording medium 5 is manufactured by using materials such as AgPdCu for a reflective layer 121, ZnSSiO$_2$ for a first protective layer 122, AgInSbTe for a recording layer 123, ZnSSiO$_2$ for a second protective layer 124 and polycarbonate having a thickness of 0.10 mm for a light transmission layer 11. An address data is recorded in a wobbling shape on a land section L of the information recording medium 5 by the frequency modulation method, wherein a phase having a phase difference of ±π/2.5 is selected so as for a wave to be continuous at a point of changing a frequency. Furthermore, the information recording medium 5 is designed with assuming that it is recorded by using a light beam having a wavelength λ of 405 nm and an objective lens having a numerical aperture NA of 0.85, and a pitch P between land sections L is 0.32 μm.

The information recording medium 5 is loaded into a recording apparatus composed of a pickup having a wavelength λ of 405 nm and a numerical aperture NA of 0.85, and a recording signal is recorded on a land section L by a modulated signal, which is modulated by the 17PP modulation method, wherein a minimum mark length (equivalent to 2T) is 0.149 μm.

The information recording medium 5 recorded with the above-mentioned recording signal is loaded into the reproducing apparatus 40 equipped with the pickup 50 having the wavelength λ of 405 nm and the numerical aperture NA of 0.85 shown in FIG. 15. By reproducing a land section L of the information recording medium 5, a signal having modulated amplitude, equivalent to (I8H−I8L)/I8H, of 0.52 can be reproduced. Succeedingly, an error rate of reproduced signal is obtained and resulted in an excellent error rate of $2 \times 10^{-5}$. Consequently, a data without any practical problems can be extracted. Further, an address error rate is about 1% at a recorded section, so that an address data can be restored excellently.

In addition thereto, if an address error rate is less than 5% when reproducing after recorded on the recording layer 12, a data including the least error can be restored through a process of error correction. Accordingly, the address error rate of about 1% is suitable for the information recording medium 5.

[Embodiment 2]

An information recording medium of an embodiment 2 is identical to that of the embodiment 1 except for a modulation method for recording a recording signal. The information recording medium of the embodiment 2 is recorded with a recording signal modulated by the "D4, 6" modulation method, wherein a minimum mark length (equivalent to 2T) is 0.154 μm, and then reproduced as the same processes as those of the embodiment 1.

By reproducing a land section L of the information recording medium, a signal having modulated amplitude, equivalent to (I12H−I12L)/I12H, of 0.60 can be reproduced. Succeedingly, an error rate of reproduced signal is obtained and resulted in an excellent error rate of $8 \times 10^{-6}$. Consequently, a data without any practical problems can be extracted. Further, an address error rate is about 1% at a recorded section, so that an address data can be restored excellently.

[Embodiment 3]

An information recording medium of an embodiment 3 is identical to that of the embodiment 1 except for a modulation method for recording a recording signal. The information recording medium of the embodiment 3 is recorded with a recording signal modulated by the "D8-15" modulation method, wherein a minimum mark length (equivalent to 3T) is 0.185 μm, and then reproduced as the same processes as those of the embodiment 1.

By reproducing a land section L of the information recording medium, a signal having modulated amplitude, equivalent to (I12H−I12L)/I12H, of 0.63 can be reproduced. Succeedingly, an error rate of reproduced signal is obtained and resulted in an excellent error rate of $4 \times 10^{-6}$. Consequently, a data without any practical problems can be extracted. Further, an address error rate is about 1% at a recorded section, so that an address data can be restored excellently.

[Embodiment 4]

An information recording medium 5 of an embodiment 4 is identical to that of the embodiment 1 except for a modulation method for recording a recording signal. The information recording medium 5 is recorded with an address data by the PM method shown in FIG. 10 on a land section L in a wobbling shape. The information recording medium 5 is recorded with a recording signal modulated by the 17PP modulation method, wherein a minimum mark length (equivalent to 2T) is 0.149 μm, and then reproduced as the same processes as those of the embodiment 1.

By reproducing a land section L of the information recording medium, a signal having modulated amplitude, equivalent to (I12H−I12L)/I12H, of 0.60 can be reproduced. Succeedingly, an error rate of reproduced signal is obtained and resulted in an excellent error rate of $2\times10^{-6}$. Consequently, a data without any practical problems can be extracted. Further, an address error rate is about 0.1% at a recorded section, so that an address data can be restored excellently.

[Embodiment 5]

An information recording medium 5 of an embodiment 5 is identical to that of the embodiment 1 except for a modulation method for recording a recording signal. An address data is recorded in a wobbling shape on a land section L of the information recording medium 5 by the base-band modulation method by Manchester code, wherein a phase having a phase difference of $\pm\pi/2.5$ is selected so as for a wave to be continuous at a point of changing a frequency. The information recording medium 5 is recorded with a recording signal modulated by the "D4, 6" modulation method, wherein a minimum mark length (equivalent to 2T) is 0.154 μm, and then reproduced as the same processes as those of the embodiment 1.

By reproducing a land section L of the information recording medium, a signal having modulated amplitude, equivalent to (I12H−I12L)/I12H, of 0.60 can be reproduced. Succeedingly, an error rate of reproduced signal is obtained and resulted in an excellent error rate of $8\times10^{-6}$. Consequently, a data without any practical problems can be extracted. Further, an address error rate is about 0.1% at a recorded section, so that an address data can be restored excellently.

COMPARATIVE EXAMPLE 1

By using the information recording medium 5 of the embodiment 1, it is recorded and reproduced as the same manner as those of the embodiment 1 except for recording on a groove section G.

By reproducing the groove section G of the information recording medium 5, a signal having modulated amplitude of 0.38 can be reproduced. Succeedingly, an error rate of reproduced signal is obtained and resulted in an error rate of $4\times10^{-3}$. Consequently, a data, which is too defective and has many bits being impossible to correct, can be extracted. Further, an address data is completely disordered. Therefore, the address data can not be extracted.

COMPARATIVE EXAMPLE 2

An information recording medium 5 of a comparative example 2 is identical to that of the embodiment 1 except for a thick ness of light transmission layer 11, which is assigned to be 0.06 mm. The information recording medium 5 of the comparative example 2 is recorded and reproduced as the same manners as those of the embodiment 1.

By reproducing the information recording medium 5, a signal having modulated amplitude of 0.46 can be reproduced. However, an eye pattern is obscure. Succeedingly, an error rate of reproduced signal is obtained and resulted in an error rate of $6\times10^{-3}$. Consequently, a data, which is too defective and has many bits being impossible to correct, can be extracted. Further, the information recording medium 5 is easily scratched by a test such that the objective lens 50b is forced to contact with and to slide on the information recording medium 5. Accordingly, the information recording medium 5 of the comparative example 2 is unsuitable for an information recording medium essentially.

COMPARATIVE EXAMPLE 3

An information recording medium of a comparative example 3 is identical to that of the embodiment 1 except for a thick ness of light transmission layer 11, which is assigned to be 0.13 mm. The information recording medium of the comparative example 3 is recorded and reproduced as the same manners as those of the embodiment 1.

By reproducing the information recording medium, a signal having modulated amplitude of 0.38 can be reproduced. However, an eye pattern is obscure. Succeedingly, an error rate of reproduced signal is obtained and resulted in an error rate of $9\times10^{-3}$. Consequently, a data, which is too defective and has many bits being impossible to correct, can be extracted. Further, an address error rate is as many as 10% at a recorded section. Consequently, only an address data, which is defective and has many bits being impossible to correct, can be extracted.

The information recording medium of the present invention is explained above with referring to the embodiments 1 through 5 and the comparative examples 1 through 3.

In the present invention, modulated amplitude is assigned to be more than 0.4 in consideration of that a reproduced signal is added with a noise inherent to a laser when reproducing an information recording medium 1. By this assignment, an information recording medium having a signal characteristic, which is compensated for an increased component of laser noise, is provided.

With respect to a second method of compensating an increased component of noise inherent to a laser, there is existed a method of regulating a reflectivity within a predetermined range. With paying attention to each "reflectivity" of the information recording mediums 1 though 5, result of a study of "relationship between reflectivity and error rate" is explained hereafter.

With respect to the information recording medium 5 shown in FIG. 8 according to the fifth embodiment of the present invention, several kinds of information recording mediums are manufactured by varying a depth (height difference between a groove section G and a land section L) of the microscopic pattern 20 formed on the substrate 13. These information recording mediums are reproduced by using the reproducing apparatus 40 composed of the light emitting element 50a equipped with a semiconductor laser of gallium nitride system compound (its RIN is −125 dB/Hz), and a relationship between a reflectivity and an error rate is examined Recording is performed under an ideal recording condition for decreasing an error rate minimally.

A reflectivity can be expressed as an output of reproduced signal. In a case of a phase change material, it is an index correlating to brightness of a crystalline state. Actually, the information recording medium 5 is recorded with a modulated signal, which is the so-called (d, k) code mentioned above. A recording apparatus will be explained later.

Loading the information recording medium 5 into the reproducing apparatus 40 in flat (without declination) and reproducing it obtains a reflectivity from a signal having a maximum length used for a code by connecting a reproduced signal in a DC system outputted form the pickup 50 to an oscilloscope. In the case of the 8/16 modulation method used for a DVD disc, for example, the maximal length is 14T. By measuring an I14H as specified by the specification (JIS Standard X6241: 1997), a reflectivity is calculated from an absolute reflectivity calibration line.

Further, an error rate is obtained by measuring a reproduced signal obtained through the demodulator 54.

Figure 17:
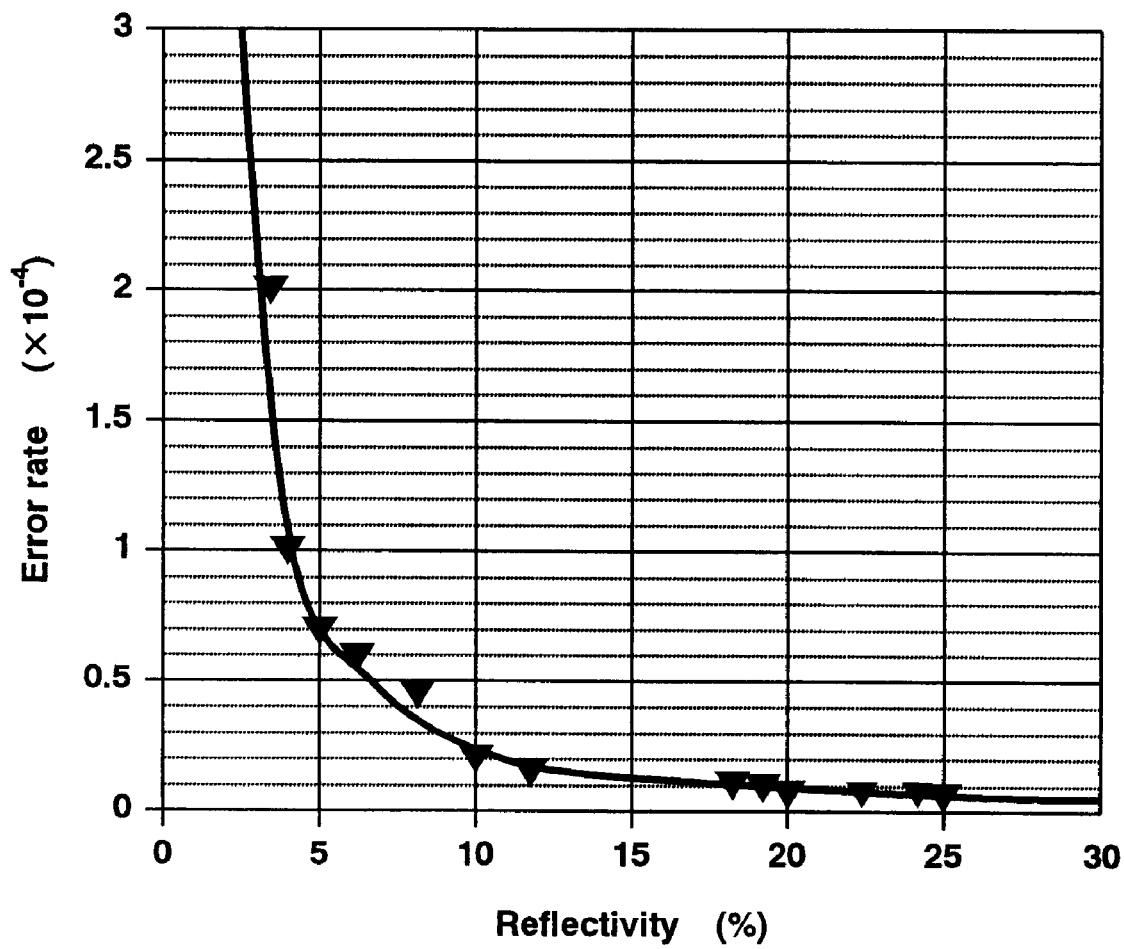
FIG. 17 is a graph exhibiting a relation between a reflectivity and an error rate.

The result is shown in FIG. 17.

FIG. 17 is a graph exhibiting a relation between a reflectivity and an error rate.

As shown in FIG. 17, there is existed a distinct relationship between a reflectivity and an error rate. It is apparent that an error rate remarkably increases in accordance with a reflectivity decreasing. If a practical error rate is assigned to be $3 \times 10^{-4}$, which is specified for a DVD disc, a necessary reflectivity becomes more than 2%.

Further, the information recording medium 5 may warp by temperature change or like in circumstances of utilization of the information recording medium 5. Therefore, with assuming that a declination of approximate 0.7 degree is possible to occur as a same situation as a DVD disc, an error rate increases due to coma aberration, which is complexly produced by a wavelength $\lambda$ within a range of 350 to 450 nm, an NA within a range of 0.75 to 0.9 and a thickness of the light transmission layer 11 within a range of 0.07 to 0.12 mm.

By the result of measurement, it is found that the error rate of $3 \times 10^{-4}$ at the declination of 0.7 degree is equivalent to an error rate of $0.7 \times 10^{-4}$ at the declination of zero degree. In other words, the error rate of $0.7 \times 10^{-4}$ is essential in consideration of a possible declination when using the information recording medium 5 practically. Accordingly, it is understood that a practical reflectivity is more than 5%.

As mentioned above, in the case that a semiconductor laser of gallium nitride system compound is used for a light emitting element, an error rate can be reduced to a practical level as low as that of the DVD disc specification if a reflectivity of the information recording medium 5 is assigned to be more than 5% in consideration of a noise being added to a reproduced signal. Further, it is found by experiments that a correlation between reflectivity and error rate such as shown in FIG. 17 can be obtained as a similar result by using any of the modulation methods mentioned above.

A maximum mark length can vary by a modulation method. However, a signal output almost saturates at more than 6T by these modulation methods and converges to a certain value. Consequently, a reflectivity obtained by recording the information recording medium 1 by the 17PP modulation method, for example, and another reflectivity obtained by the 8/16 modulation method become a same value as each other.

In consideration of a reproduction characteristic of information recording medium, the information recording mediums 1 through 5 of which reflectivity is assigned to be more than 5% according to the present invention are explained hereinbefore.

In consideration of general characteristics of a recording apparatus and a reproducing apparatus, which are equipped with a semiconductor laser of gallium nitride system compound as a light emitting element, and physical characteristics of the recording layer 12 or 123 composed of a phase change material totally, a practical range of reflectivity necessary for realizing a total system is explained next.

An output of a semiconductor laser of gallium nitride system compound is 30 mW maximally. Generally, an output of light emitting element falls down to almost one fifth of original output of the light emitting element inside a recording apparatus due to a coupling efficiency of optical element, which is used for a wavelength $\lambda$ being within a range of 350 to 450 nm. In other words, a laser power becomes 6 mW on each surface of the information recording mediums 1 through 5 even though a laser having an output of 30 mW is used. On the contrary, it is desirable that a recording power is assigned to be higher as high as possible in order to realize excellent phase change recording in contrast. Therefore, it is necessary for the information recording mediums 1 through 5 to be recorded by a recording power of about 6 mW. It is necessary for absorptivity and transmissivity of the recording layer 12 or 123 of the information recording mediums 1 through 5 to be relatively higher value therefor.

Noise of a semiconductor laser of gallium nitride system compound and increasing of noise of a reproducing apparatus equipped with such a semiconductor laser are explained hereinbefore. However, it is necessary to pay attention to that noise depends upon a reproduction power. When a laser noise is measured by varying a reproduction power, it is found that noise increases in a lower laser power by using a semiconductor laser of gallium nitride system compound, particularly, it is found that there is existed a critical point at the reproduction power of 0.35 mW on a surface of information recording medium. In other words, if a reproduction power is below 0.35 mW, noise increases remarkably. Therefore, it is necessary for a reproduction power of the information recording mediums 1 through 5 to be more than 0.35 mW.

With respect to physical characteristics of the recording layer 12 or 123, if a reproduction power is increased, the recording layer is thermally damaged and there is existed a phenomenon such that a record mark M disappears. Particularly, in a case that a wavelength $\lambda$ is within the range of 350 to 450 nm, energy density of a spot S to be formed on an information recording medium becomes larger than that of a red semiconductor laser (of which wavelength $\lambda$ is within a range of 635 to 830 nm, for example). Therefore, a reproduction power is assigned to be lower. However, since a minimum reproduction power is limited as mentioned above, a permitted limit of reproduction power is obliged to be narrower. In order to increase resistivity for reproduction power, that is, in order to assign a reproduction power to be higher, it is necessary for absorptivity and transmissivity of the recording layer 12 or 123 of the information recording mediums 1 through 5 to be relatively lower value.

In consideration of general characteristics of a recording apparatus and a reproducing apparatus, which are equipped with a semiconductor laser of gallium nitride system compound as a light emitting element, and physical characteristics of the recording layer 12 or 123 composed of a phase change material totally, as mentioned above, a recording power is assumed to be about 6 mW and a reproduction power is necessary to be more than 0.35 mW. Further, an information recording medium of which record mark M on the recording layer 12 or 123 is hardly erased by the reproduction power of more than 0.35 mW is required. In order to satisfy these various limits, it is necessary for absorptivity and transmissivity of the recording layer 12 or 123 of the information recording mediums 1 through 5 to be relatively higher value with respect to a material for the recording layer 12 or 123 of the information recording mediums 1 through 5 due to limitation for recording power. Furthermore, it is necessary for the absorptivity and transmissivity to be relatively a lower value due to limitation of resistivity for reproduction power.

In other words, it is necessary for absorptivity and transmissivity to be set within a predetermined range. A total amount of absorptivity, transmissivity and reflectivity is one. Therefore, it is also necessary for the reflectivity to be set within a predetermined range.

A range of reflectivity satisfying the above-mentioned various limits is experimentally studied and a range of 12 to 26% is found. Processes of experimental study are definitely explained as embodiments 6 through 12 and comparative examples 4 and 5 hereinafter.

[Embodiments 6 Through 12]

FIG. 18 is a table showing reflectivity and reproduction characteristics of embodiments 6 through 12 and comparative examples 4 and 5.

Polycarbonate having a thickness of 1.1 mm is used for a substrate 13 of a phase change type information recording medium 5. Further, the information recording medium 5 is manufactured by using materials such as $Ag_{98}Pd_1Cu_1$ for a reflective layer 121, $ZnS$—$SiO_2$ (in the proportion of 80:20 in mol %) for a first protective layer 122, $Ge_8Sb_{69}Te_{23}$ for a recording layer 123 and $ZnS$—$SiO_2$ (in the proportion of 80:20 in mol %) for a second protective layer 124, wherein each layer is formed in a certain film thickness shown in FIG. 18. Finally, polycarbonate having a thickness of 0.10 mm is laminated on the second protective layer 124 as a light transmission layer 11. Consequently, the information recording medium 5 is completed.

An address data is recorded in a wobbling shape on a land section L of the information recording medium 5 by the frequency modulation method, wherein a phase having a phase difference of $\pm\pi/2.5$ is selected so as for a wave to be continuous at a point of changing a frequency.

The information recording medium 5 is designed with assuming that it is recorded by using a light beam having a wavelength $\lambda$ of 405 nm and an objective lens having a numerical aperture NA of 0.85, and a pitch P between land sections L is 0.32 μm. The reflective layer 121 and recording layer 123 are formed in an atmosphere of 5 mTorr of argon gas by the DC sputtering, wherein a vacuum chamber used for sputtering is previously evacuated as low as less than $1\times10^{-6}$ Torr.

Further, the completed information recording medium 5 is initialized such that the recording layer 123 is changed in phase from an amorphous state low in reflectivity to a crystalline state high in reflectivity by irradiating a laser beam from the light transmission layer 11 side.

The information recording medium 5 is loaded into a recording apparatus composed of a pickup having a wavelength $\lambda$ of 405 nm and a numerical aperture NA of 0.85, and a recording signal is recorded on a land section L by a modulated signal, which is modulated by the 17PP modulation method, wherein a minimum mark length (equivalent to 2T) is 0.160 μm. Conditions for recording are as follows: 6.0 mW of recording power, 2.6 mW of bias power, 0.1 mW of bottom power between multi-pulses and bottom power of cooling pulse, and 5.3 m/s of linear velocity.

Further, recording is a so-called recording by multi-pulses method, which adopts a three-value power modulation such that each width of a head pulse and a succeeding pulse is 0.4 times the recording period 1T and a width of cooling pulse is 0.4 times the recording period 1T.

The information recording medium 5 recorded with the above-mentioned recording signal is loaded into the reproducing apparatus 40 equipped with the pickup 50 having the wavelength $\lambda$ of 405 nm and the numerical aperture NA of 0.85 shown in FIG. 15. Items to be evaluated are as follows: reflectivity, modulated amplitude, equivalent to (I8H–I8L)/I8H, reproduction laser power at limit of deterioration, reproduction error rate of record mark M and address error rate. The reproduction laser power at limit of deterioration is obtained by measuring a power such that reproducing the information recording medium 5 at the reproduction power of 0.3 mW first, increasing the reproduction power from 0.3 mW gradually, and measure a power when it is recognized that reproduction is deteriorated. The reproduction laser power at limit of deterioration, reproduction error rate and address error rate out of the items to be evaluated are judged by a reference value and determined to be acceptable or not.

With respect to a standard for judging the reproduction laser power at limit of deterioration, one can be reproduced by the reproduction power of more than 0.35 mW is acceptable (O) and another can not be reproduced is not acceptable (x). With respect to a standard for judging the reproduction error rate, one can be reproduced by the error rate of less than $0.7\times10^{-4}$ is acceptable (O) and another can not be reproduced is not acceptable (x). Further, with respect to a standard for judging the address error rate, one can be reproduced by the error rate of less than 5% (it is a limit of restoration by an error correction) is acceptable (O) and another can not be reproduced is not acceptable (x). Actual values of reflectivity, modulated amplitude and reproduction laser power at limit of deterioration, and judgment result of reproduction laser power at limit of deterioration, reproduction error rate and address error rate are summarized in FIG. 18. In FIG. 18, "Emb." and "Comp." represent "Embodiment" and "comparative example" respectively.

As shown in FIG. 18, each information recording medium 5 manufactured by having a reflectivity within a range of 12 to 26% according to the embodiments 6 through 12 is excellent in deteriorated reproduction, reproduction error rate and address error rate. Consequently, the information recording medium according to the embodiments 6 through 12 can satisfy performance as a total system.

COMPARATIVE EXAMPLE 4

An information recording medium of which each layer is altered so as for a reflectivity to be 11.0% is prepared for the information recording medium 5 according to the comparative example 4 and evaluated as the same manner as mentioned above in the embodiments 6 through 12. A result of evaluation is listed in FIG. 18.

According to the information recording medium 5 of the comparative example 4, reproduction is deteriorated at the reproduction power of 0.34 mW. Therefore, it is judged that sensitivity of the recording layer 123 is too high. Accordingly, an information recording medium having a reflectivity of less than 11% is not suitable for a total system.

COMPARATIVE EXAMPLE 5

An information recording medium of which each layer is altered so as for a reflectivity to be 28.2% is prepared for the information recording medium 5 according to the comparative example 5 and evaluated as the same manner as mentioned above in the embodiments 6 through 12. A result of evaluation is listed in FIG. 18.

In a case of the comparative example 5, there is not existed a problem of deteriorated reproduction. However, the reproduction error rate is high and resulted in defective. It is supposed to be a cause that the modulated amplitude is too small as low as 0.389. In other words, it is supposed that sensitivity of the recording layer 123 is too low to be recorded in sufficient contrast. Therefore, an information recording medium having a reflectivity of more than 28% is not suitable for a total system.

According to the evaluation result of the embodiments 6 through 12 and the comparative examples 4 and 5, it is understood that a range of reflectivity suitable for a total system is 12 to 26%.

With referring to FIG. 17, the embodiments 6 through 12, the comparative examples 4 and 5 and FIG. 18, the information recording mediums 1 through 5 are explained hereinbefore. According to the present invention, in consideration of that noise inherent to a laser is added to a reproduced signal while reproducing the information recording medium 1, the reflectivity is assigned to be more than 5%, preferably to be within a range of 12 to 26%. Accordingly, an information recording medium having a signal characteristic of compensating an increased component caused by laser noise is provided.

The reproducing apparatus 40 shown in FIG. 15 of the present invention and the information recording mediums 1 through 5 of the present invention, which are loaded therein, are explained above. The first reproduction apparatus 40 explained hereinbefore is a reproducing apparatus for reading out information recorded in the recording layer 12 or 123, particularly, can reproduce contents recorded continuously for a long period of time. For example, it can be used for reproducing a HDTV (high definition television) program and a movie recorded by video equipment.

With referring to FIG. 19, a second reproducing apparatus 41 according to the present invention is explained next.

A case of using the information recording medium 1 as for an information recording medium is explained hereinafter. However, the other information recording mediums 2 through 5 is the same situation as the information recording medium 1.

The second reproducing apparatus 41 is identical to the first reproducing apparatus 40 shown in FIG. 15 except for being equipped with an auxiliary information demodulator 56 allocated between the pickup 50 and the controller 60, wherein an auxiliary information is read out by a pickup 50. It is a reproducing apparatus used for index reproducing a HDTV program and a movie in video recording and for index reproducing a computer recorded with data.

As mentioned above, a signal transmitted from the pickup 50 and to the demodulator 54 is a total sum signal (that is, Ia+Ib+Ic+Id) of output from all 4 sections of a 4-division light detector not shown, wherein each of Ia, Ib, Ic and Id corresponds to each output of a 4-division light detector for a DVD disc defined by the JIS Standard No. X6241: 1997. On the other hand, another signal transmitted from the pickup 50 to the auxiliary information demodulator 56 is a differential signal (that is, "(Ia−Ib)−(Ic−Id)") of output from the 4-division light detector in the radial direction. An auxiliary information recorded in a shape of wobbling groove on the information recording medium 1 can be extracted by monitoring the differential signal because the wobbling is formed in the radial direction.

With respect to an actual configuration of the auxiliary information demodulator 56, it is composed of at least one of an amplitude modulation (AM) demodulator, a frequency modulation (FM) demodulator and a phase modulation (PM) demodulator. In a case of the AM demodulator, an envelope detector circuit can be suitably used. In a case of the FM demodulator, a frequency detector circuit and a synchronous detector circuit can be suitably used. In a case of the PM detector, a synchronous detector circuit, a delay detector circuit and an envelope detector circuit can be suitably used. A sum signal may leak in a differential signal in the radial direction although it is quite little. In order to avoid such leakage, a band pass filter tuned in a frequency band of the auxiliary information can be connected in front of the auxiliary information demodulator 56.

Operations of the second reproducing apparatus 41 are explained next.

A reproducing light 70 is emitted from a light emitting element 50a of the pickup 50 and converged at the microscopic pattern 20 in the information recording medium 1. Actually, the reproducing light 70 is focused on the microscopic pattern 20, which is allocated at a depth of 0.07 to 0.12 mm equivalent to a thickness of the light transmission layer 11. Succeedingly, tracking of the reproducing light 70 is performed to either one of the groove section G or the land section L. The tracking is performed with choosing a predetermined side. However, as mentioned above, choosing the land section L is most desirable.

Then, an auxiliary information is read out by transmitting the differential signal ("(Ia+Ib)−(Ic+Id)") in the radial direction from the pickup 50 to the auxiliary information demodulator 56. At this moment, with paying attention to an address information out of various kinds of auxiliary information, the auxiliary information is compared with an address for indexing a data inputted to a controller 60.

If the auxiliary information does not coincide with the address, the controller 60 sends a signal to a servo device 52 and directs to search. Searching is performed such that a number of rotations of a motor 51 is reset to a number of rotations, which is suitable for a radius between the motor 51 and the pickup 50, according to movement in the radial direction of the pickup 50 while scanning the movement of the pickup 50 in the radial direction. During a process of scanning, an address outputted from the auxiliary information demodulator 56, which receives a differential signal from the pickup 50, is compared with a certain address. The searching is continued until they coincide with each other. When they coincide, scanning in the radial direction is interrupted and reproduction is switched over to continuous reproduction. An output from the demodulator 54, which is inputted with the sum signal (Ia+Ib+Ic+Id), becomes a signal of a demodulated data stream obtained by indexing and is inputted to an interface (I/F) 55. Finally, a signal is outputted externally in accordance with controlling by the controller 60.

As mentioned above, the information recording medium 1 and the second reproducing apparatus 41 according to the present invention are designed for coping with the reproducing light 70, which is produced by the light emitting element 50a having single wavelength $\lambda$ within the range of 350 to 450 nm and the objective lens 50b having the numerical aperture NA of 0.75 to 0.9. Therefore, the second reproducing apparatus can preferably reproduce an auxiliary information and perform index reproduction of a data stream in conjunction with reproducing the information recording medium 1 preferably.

Figure 20:
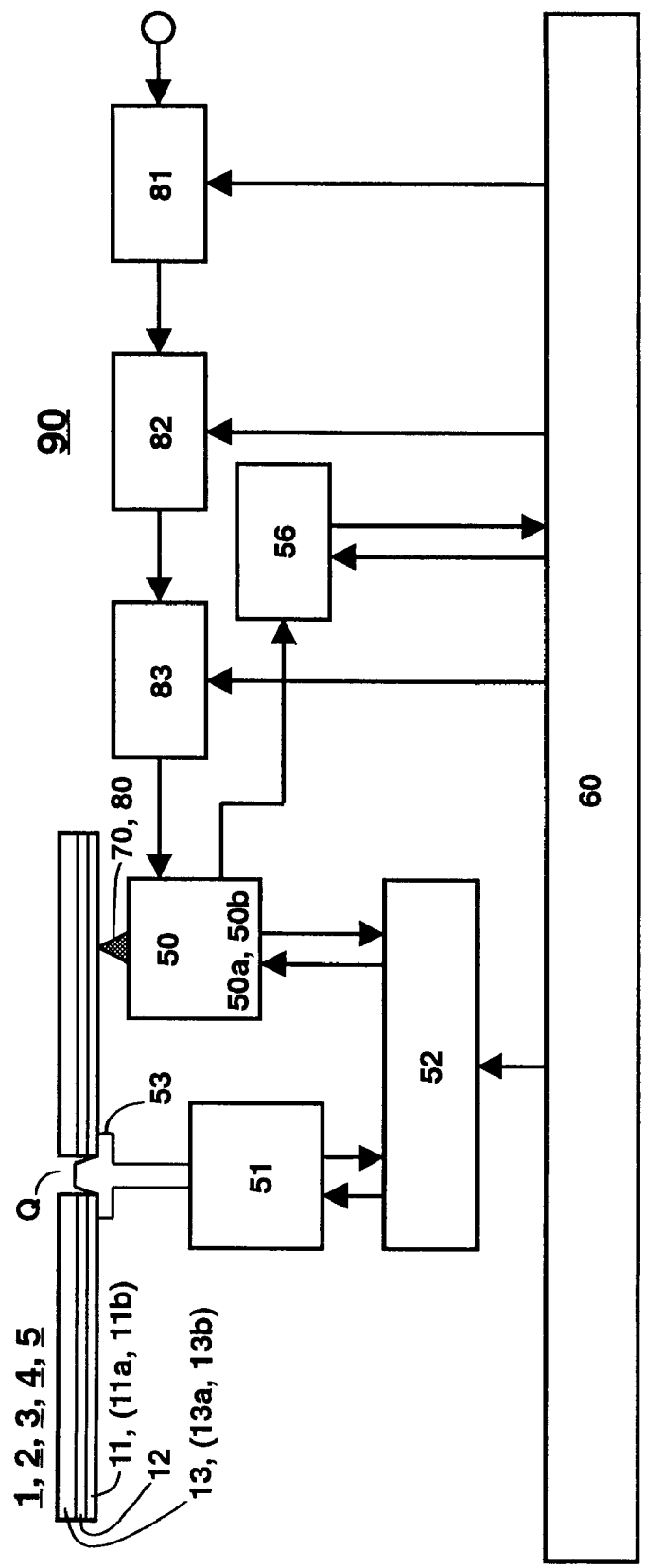
FIG. 20 is a block diagram of a recording apparatus according to the present invention.

With referring to FIG. 20, a recording apparatus 90 according to the present invention is explained, wherein the information recording medium 1 is used as an information recording medium for explaining functions and operations of the recording apparatus 90. However, the other information recording mediums 2 through 5 are the same situations as the information recording medium 1.

FIG. 20 is a block diagram of a recording apparatus according to the present invention.

Figure 19:
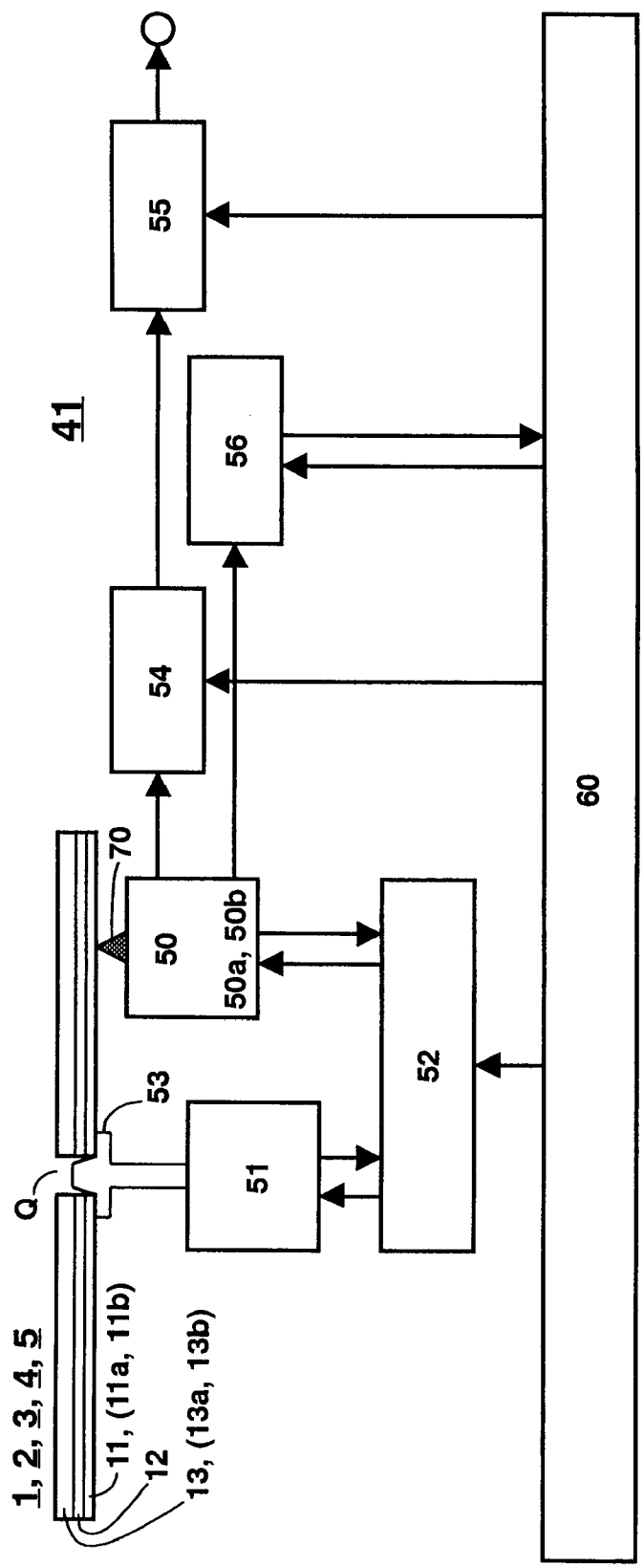
FIG. 19 is a block diagram of a second reproducing apparatus according to the present invention.

As shown in FIG. 20, the recording apparatus 90 is similar to the second reproducing apparatus 41 shown in FIG. 19 except for that the demodulator 54 is replaced with a modulator 82 for modulating an original data and a waveform converter 83 for transforming a modulated signal from the modulator 82 into a form suitable for recording on the information recording medium 1, which are connected in series. Further the I/F 55 is replaced with an interface (I/F) 81 for receiving an external signal to be recorded.

The recording apparatus 90 is an apparatus for recording a computer data, for example, at a predetermined address newly or recording a HDTV program or a movie continuously from a predetermined address as a video recording.

The modulator 82 is a modulator of converting an 8-bit original data into 16 bits, in the case of the 8/16 modulation (EFM plus) method for a DVD disc. The waveform converter 82 transforms a modulated signal received from the modulator 82 into a form suitable for recording on the information recording medium 1. Actually, the waveform converter 83 is a converter, which converts the modulated signal into a recording pulse satisfying a recording characteristic of the recording layer 12 of the information recording medium 1. For example, in a case that the recording layer 12 is composed of a phase change material, a so-called multi-pulse is formed. In other words, the modulated signal is divided into a unit of a channel bit or less and power is changed into a rectangular waveform, wherein peak power, bottom power erase power and a pulse time duration constituting a multi-pulse are assigned in accordance with a direction of a controller 60.

Operations of the recording apparatus 90 are explained next.

A reproducing light 70 is emitted from a light emitting element 50*a* of a pickup 50 and converged at the microscopic pattern 20 in the information recording medium 1. Actually, the reproducing light 70 is focused on the microscopic pattern 20, which is allocated at a depth of 0.07 to 0.12 mm equivalent to a thickness of the light transmission layer 11. Succeedingly, tracking of the reproducing light 70 is performed to either one of the groove section G or the land section L. The tracking is performed with choosing a predetermined side. However, as mentioned above, choosing the land section L is most desirable. Then, an auxiliary information is read out by transmitting the differential signal ("(Ia+Ib)−(Ic+Id)") in the radial direction from the pickup 50 to an auxiliary information demodulator 56.

At this moment, with paying attention to an address information out of various kinds of auxiliary information, the auxiliary information is compared with an address for indexing a data inputted to the controller 60. If the auxiliary information does not coincide with the address, the controller 60 sends a signal to a servo device 52 and directs to search. Searching is performed such that a number of rotations of a motor 51 is reset to a number of rotations, which is suitable for a radius between the motor 51 and the pickup 50, according to movement in the radial direction of the pickup 50 while scanning the movement of the pickup 50 in the radial direction.

During a process of scanning, an address outputted from the auxiliary information demodulator 56, which receives a differential signal from the pickup 50, is compared with a certain address. The searching is continued until they coincide with each other. When they coincide, scanning in the radial direction is interrupted and reproduction is switched over to continuous reproduction. In other words, a data inputted from the I/F 81 is modulated by the modulator 82 in accordance with controlling by the controller 60. Succeedingly, the data modulated by controlling of the controller 60 is inputted to the waveform converter 83 and converted into a format suitable for recording, and then outputted to a pickup 50.

In the pickup 50, a recording light 80 of which a recording power is altered to that assigned by the waveform converter 83 is generated and irradiated on the information recording medium 1. Consequently, recording at a predetermined address on the information recording medium 1 is performed. It is possible that the differential signal ("(Ia+Ib)−(Ic+Id)") in the radial direction is read out by the recording light 80, and an address can be extracted from the auxiliary information demodulator 56 even while recording. Therefore, a regional recording limited as far as an address desired by a user can be realized.

As mentioned above, the information recording medium 1 and the recording apparatus 90 according to the present invention are designed for coping with the reproducing light 70 and the recording light 80, which are generated by the light emitting element 50*a* having single wavelength λ within the range of 350 to 450 nm and an objective lens 50*b* having the numerical aperture NA of 0.75 to 0.9. Therefore, the recording apparatus 90 can preferably record on the information recording medium 1 and, at the same time can reproduce an auxiliary information, and then perform random indexing for recording.

The information recording mediums 1 through 5, the first and second reproducing apparatuses 40 and 41 and the recording apparatus 90 are explained in details hereinbefore. Further, in the embodiments of the present invention, fundamental areas of the present invention are explained. However, it is apparent that many changes, modifications and variations in the arrangement of equipment and devices and in materials without departing from the invention concept disclosed herein. For example, an information recording medium having multi-layers (for instance, triple and quadruple layers) of a set of the recording layer 7 and the light transmission layer 8 laminated together can be applicable other than the information recording medium 1 having a single layer and double layers of the microscopic pattern 20.

Furthermore, with respect to the first and second reproducing apparatus 40 and 41 and the recording apparatus 90, it is also apparent that each operation of them is not limited to those mentioned above without departing the invention concept disclosed herein. For example, a reproducing method and a recording method, which derive from replacing each operation of the first and second reproducing apparatuses 40 and 41 and the recording apparatus 90 with each step of reproducing and recording processes, can be introduced for the present invention. Moreover, it is apparent that a computer program, which performs each step of the reproducing method, and another computer program, which performs each step of the reproducing method, are included in the present invention.

EFFECT OF THE INVENTION

As mentioned above, according to an aspect of the present invention, there provided an information recording medium, which is at least composed of a substrate having a microscopic pattern constituted by a shape of continuous substance of approximately parallel grooves formed with a groove section and a land section alternately, a recording layer formed on the microscopic pattern and a light transmission layer formed on the recording layer. Further, the microscopic pattern is formed with having a relation of P<λ/NA and a thickness of the light transmission layer is within a range of 0.07 to 0.12 mm, wherein P is a pitch of the groove section or the land section, λ is a wavelength of reproducing light beam and NA is a numerical aperture of objective lens. Therefore, an information recording medium, which can reduce cross erase and also be recorded in higher density, can be obtained. Furthermore, recording in accordance with difference of reflectivity or phase difference is performed by assigning modulated amplitude to be more than 0.4, so that an error rate can be decreased to a practical level.

According to another aspect of the present invention, there provided a reproducing apparatus for reproducing an information recording medium, which is composed of a substrate having a microscopic pattern constituted by a shape of continuous substance of approximately parallel grooves formed with a groove section and a land section alternately. The reproducing apparatus is at least composed of a light emitting element of which a wavelength of reproducing light is A nm, and having RIN (relative intensity noise) of less than −125 dB/Hz and an objective lens having a numerical aperture NA. Further, the λ is within a range of 350 to 450 nm and the NA is within a range of 0.75 to 0.9. Furthermore, the reproducing light is irradiated on either one of the land section and the groove section. Therefore, cross erase can be reduced.

In the information recording medium according to the present invention, an auxiliary information such as an address data is recorded in shape on a part of or all over the microscopic pattern by an amplitude modulation (AM) method, so that an information can be demodulated even in a low C/N (carrier to noise ratio) circumstance. Further, an auxiliary information such as an address data is recorded in shape on a part of or all over the microscopic pattern by a frequency modulation (FM) method, so that an information can be demodulated by a simplified circuit. Particularly, by using the FM method selected with a proper phase, which is suitable for two waves to be connected continuously at a point where their frequencies change over, a reproduction envelope becomes approximately constant and stable reproduction can be realized. Furthermore, an auxiliary information such as an address data is recorded in shape on a part of or all over the microscopic pattern by a phase modulation (PM) method, so that an information can be demodulated by a synchronous detection even in a low C/N circumstance. In particular, if phase difference between a high frequency component and a low frequency component is assigned to be ±π/2.5, excellent signal demodulation can be realized by the synchronous detection even in a low C/N circumstance.

In addition thereto, an auxiliary information such as an address data can be improved in stability of readout, if the auxiliary information is previously formed in a data modulated in a base-band, in which a number of same bits continuing is limited to be less than a predetermined quantity.

It should be understood that many modifications and adaptations of the invention will become apparent to those skilled in the art and it is intended to encompass such obvious modifications and changes in the scope of the claims appended hereto.

What is claimed is:

1. A reproducing apparatus comprising:
a recording medium having
(a) a substrate having a microscopic pattern, having a continuous shape of approximately parallel grooves formed with alternating groove and land sections;
(b) a recording layer formed on the microscopic pattern;
(c) a light transmission layer formed on the recording layer;
wherein the microscopic pattern is formed so as to satisfy a relation of P<λ/NA and a thickness of the light transmission layer is within a range of 0.07 to 0.12 mm, and
wherein P is a pitch of the groove section or the land section, λ is a wavelength of reproducing light beam and NA is a numerical aperture of an objective lens; and
wherein the land section is wobbled in the radial direction and having a wobbled shape corresponding to a signal to be recorded on the land section resulting from the modulation of a phase modulated wave that is further modulated by a single frequency wave, the single frequency wave having a frequency of integral multiples or one over integral multiples of a frequency of the phase modulated wave, and
wherein the frequency of the single frequency wave is different from that of the phase modulated wave; and
further wherein a refractive index of the light transmission layer is within a range of 1.45 to 1.7,
the reproducing apparatus further comprising:
(d) a pickup composed of a light emitting element having a wavelength of λ within a range of 350 to 450 nm and an objective lens having a numerical aperture of NA within a range of 0.75 to 0.9 for reading out reflected light from and recording on the information recording medium;
(e) a motor for rotating the information recording medium;
(f) servo means for controlling the drive of the pickup and the motor;
(g) a turntable for supporting the information recording medium while rotating;
(h) demodulator means for demodulating an information signal read out by the pickup, wherein the demodulator means is composed of a limit equalizer;
(i) interface (I/F) means for transmitting a signal demodulated by the demodulator means externally;
(j) auxiliary information demodulator for demodulating a differential signal outputted from the pickup; and
(k) controlling means for controlling the entire reproducing apparatus.

* * * * *